(12) United States Patent  
Choi

(10) Patent No.: US 9,490,876 B2
(45) Date of Patent: Nov. 8, 2016

(54) ELECTRONIC DEVICE AND OPERATING METHOD THEREOF

(71) Applicant: Samsung Electronics Co., Ltd., Gyeonggi-do (KR)

(72) Inventor: Yong-Suk Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/620,490

(22) Filed: Feb. 12, 2015

(65) Prior Publication Data

US 2015/0236758 A1 Aug. 20, 2015

(30) Foreign Application Priority Data

Feb. 20, 2014 (KR) .................. 10-2014-0019606

(51) Int. Cl.
*H04B 5/00* (2006.01)
*H04B 5/02* (2006.01)

(52) U.S. Cl.
CPC .............. *H04B 5/0043* (2013.01); *H04B 5/02* (2013.01)

(58) Field of Classification Search
CPC ............................... H04B 5/0043; H04B 5/02
USPC ........................................................ 455/41.1
See application file for complete search history.

(56) References Cited

U.S. PATENT DOCUMENTS

| | | |
|---|---|---|
| 2005/0250553 A1 | 11/2005 | Lim |
| 2006/0116175 A1 | 6/2006 | Chu |
| 2008/0090537 A1* | 4/2008 | Sutardja .................. G06F 1/3203 455/232.1 |
| 2009/0140863 A1* | 6/2009 | Liu ........................ G06F 1/3203 340/573.1 |
| 2009/0143028 A1 | 6/2009 | Kim |
| 2011/0241837 A1* | 10/2011 | Suzuki .................. G06K 7/0008 340/10.1 |
| 2013/0149963 A1* | 6/2013 | Kitagawa ............. H04B 5/0093 455/41.1 |
| 2013/0196596 A1* | 8/2013 | Parekh .................. G06F 1/1643 455/41.1 |
| 2014/0009172 A1 | 1/2014 | Rizkallah |
| 2014/0176306 A1* | 6/2014 | Lee ..................... G06K 7/10237 340/10.1 |
| 2014/0220887 A1 | 8/2014 | Yang et al. |

FOREIGN PATENT DOCUMENTS

| | | |
|---|---|---|
| EP | 1 592 141 A2 | 11/2005 |
| EP | 2 683 144 A1 | 1/2014 |
| KR | 10-2012-0092062 A | 8/2012 |
| WO | 2012/108719 A3 | 8/2012 |
| WO | 2013/137892 A1 | 9/2013 |

* cited by examiner

Primary Examiner — April G Gonzales
(74) Attorney, Agent, or Firm — Cha & Reiter, LLC

(57) ABSTRACT

An electronic device with wireless communication capability including at least one antenna, a detection module, and a setting module. The detection module detects an amount of a current returning from the at least one antenna. The setting module sets at least one user interface corresponding to the detected amount of the current, and when the detected amount of current is below a threshold, abnormal operation is indicated. The amount of current returning can be affected by devices sufficiently close to interfere with the transmissive capabilities.

28 Claims, 22 Drawing Sheets

| CIRCUMSTANCE | FEEDBACK VALUE |
|---|---|
| OPEN SPACE | 0x160 ~ 0x180 |
| IN THE CASE WHERE USER'S GRIPPING AMOUNT IS HIGH | 0x40 ~ 0x60 |
| IN THE CASE WHERE USER'S GRIPPING AMOUNT IS LOW | 0x90 ~ 0xFF |
| IN THE CASE WHERE NFC TAG APPROACHES | 0x20 ~ 0x30 |
| IN THE CASE WHERE IT IS PUT ON METAL PLATE | 0 |

FIG.12

ELECTRONIC DEVICE AND OPERATING METHOD THEREOF

CLAIM OF PRIORITY

This application claims the benefit under 35 U.S.C. §119 from a Korean patent application filed in the Korean Intellectual Property Office on Feb. 20, 2014 and assigned Serial No. 10-2014-0019606, the entire disclosure of which is hereby incorporated by reference in its entirety.

BACKGROUND

1. Field of the Disclosure

The present disclosure relates to an electronic device having a Near Field Communication (NFC) function and an operating method thereof. More particularly, the present disclosure relates to an electronic device and ways to monitor operation of wirelessly transceiving with other devices.

2. Description of the Related Art

Due to developments in electronic communication, electronic devices such as cellular phones, electronic schedulers, personal digital assistants (PDAs), laptop computers, etc. have become necessities of a modern society, and provide an important means for delivering rapidly changing information. Such devices are typically conveniently operated through Graphic User Interface (GUI) environments implemented on a touch screen, and thus provide a variety of information, network access and multimedia.

In order to provide the various functionalities desired by consumers, a user device includes various electronic components configured to provide the various functions. For example, a user device may include a stereo speaker module to provide a listening-to-music function that uses stereo sounds. Similarly, the user equipment (UE) includes a camera module to provide a photo shooting functions. Furthermore, the UE includes a communication module to provide a communication function with another electronic device via a network.

SUMMARY

The present disclosure provides an electronic device for recognizing a member approaching the electronic device without the addition of separate parts to save costs.

Furthermore, the present disclosure provides an electronic device that adaptively operates according to neighboring circumstances (for example, a type of an approaching member, an approach position, an approach distance, or an approach range, etc.) which the electronic device encounters in order to prevent deterioration of a function, especially when wireless communication play a role in the delivery of the function.

In accordance with an aspect of the present disclosure, an electronic device includes at least one antenna, a detection module configured to detect an amount of a current returning from the at least one antenna, and a setting module configured to set at least one user interface corresponding to the amount of the current.

In accordance with another aspect of the present disclosure, a method for operating an electronic device includes detecting an amount of a current (e.g. RF power, returning signal power, etc.) returning from at least one antenna and setting at least one user interface corresponding to the amount of the current.

In accordance with yet another aspect of the present disclosure, a Near Field Communication (NFC) controller includes an NFC module including circuitry configured to generate a reception signal corresponding to a Radio Frequency (RF) reception signal received via an NFC antenna to transmit the same to a processor, and to generate an RF transmission signal corresponding to a transmission signal received from the processor to transmit the same to an outside device via the NFC antenna; and a detection module including circuitry configured to detect an amount of a current returning from the NFC antenna to output the same to the processor.

The teachings of the present disclosure as embodied in the appended claims may improve a user's convenience and prevent deterioration of at least one function via a method of determining a neighboring circumstance (for example, a type of an approaching member, an approach position, an approach distance, or an approach range) which an electronic device encounters using at least one antenna (for example, an NFC antenna), and adaptively setting at least one user interface in response thereto.

Other aspects, advantages and salient features of the disclosure will become better understood by those skilled in the art from the following detailed description, which, taken in conjunction with the annexed drawings, discloses exemplary embodiments of the disclosure.

BRIEF DESCRIPTION OF THE DRAWINGS

The present disclosure will be more apparent from the following description taken in conjunction with the accompanying drawings in which:

FIG. 12 is a view illustrating an amount of a returning current coming back via an NFC antenna in UE that encounters various neighboring circumstances according to various embodiments of the present disclosure;

Throughout the drawings, like reference numerals will be understood to refer to like parts, components and structures.

DETAILED DESCRIPTION

Figure 1:
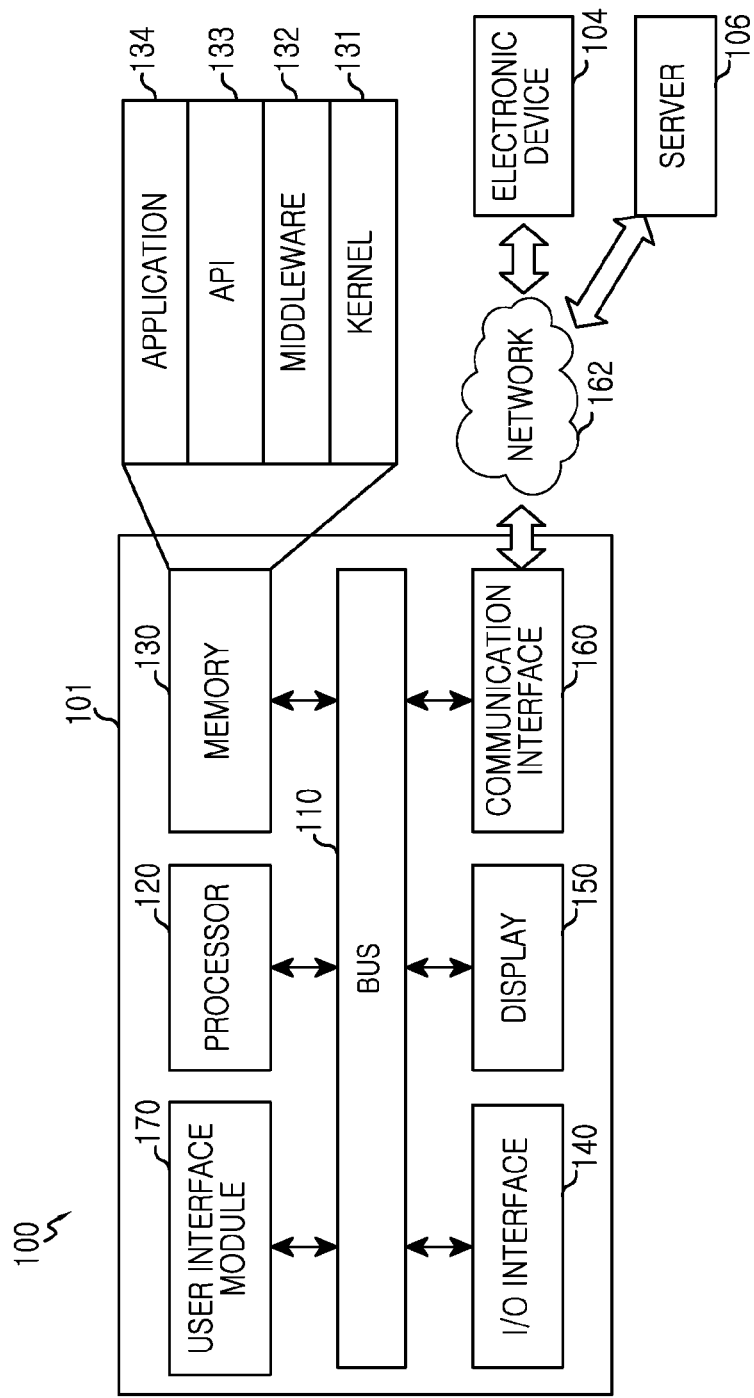
FIG. 1 is a view illustrating a network environment including an electronic device according to various embodiments of the present disclosure.

Hereinafter, the present disclosure will be described with reference to the accompanying drawings. The present disclosure has various embodiments, and specific embodiments are exemplarily described and related detailed descriptions are made. However, it should be understood that the various embodiments of the present disclosure are not limited to a specific embodied form and include all modifications and/or equivalents or substitutions that fall within the spirit and technical scope of the present disclosure. In the drawings, like reference numerals are used for like elements.

Expressions such as "include" or "may include", etc. that may be used for the present disclosure indicate existence of a disclosed relevant function, operation, or element, etc., and do not limit additional one or more functions, operations, or elements, etc. Also, it should be understood that terminologies such as "include" or "have", etc. in the present disclosure are intended for designating existence of a characteristic, a number, a step, an operation, an element, a part, or a combination of these described on the specification and do not exclude in advance existence or addition possibility of one or more other characteristics, numbers, tasks, operations, elements, parts, or a combination of these.

Expression such as "or", etc. in the present disclosure includes a certain and all combinations of words listed together. For example, "A or B" may include A and may include B, or include both A and B.

In the present disclosure, ordinal expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle (therebetween). In contrast, when it is mentioned that a certain element is "directly connected to" or "directly accesses" another element, it should be understood that still another element does not exist between the elements.

Terminologies used in the present disclosure are provided for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary may have meaning coinciding with meaning on context of a related technology, and unless clearly defined in the present disclosure, they are not understood as an ideal or excessively formal meaning.

An electronic device according to the present disclosure may be a device including a communication function. For example, an electronic device may be for example one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (for example, a head-mounted-device "HMD" such as electronic glasses, an electronic clothing, an electronic bracelet, an electronic necklace, an electronic accessory, an electronic tattoo, or a smart watch), just to name some non-limiting possibilities.

According to an embodiment of the present disclosure, an electronic device may be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (for example, Samsung HomeSync™, Apple TV™, or Google TV™), game consoles, an electronic dictionary, an electronic key, a camcorder, or an electronic frame.

According to an embodiment of the present disclosure, an electronic device may include at least one of various medical devices (for example, Magnetic Resonance Angiography "MRA", Magnetic Resonance Imaging "MRI", Computed Tomography "CT", a shooting device, an ultrasonic device, etc.), a navigation device, a Global Positioning System (GPS) receiver, an event data recorder (EDR), a flight data recorder (FDR), an automobile infotainment device, electronic equipment for a ship (for example, a navigation device for a ship, a gyro compass, etc.), an avionics, a security device, and a robot for an industrial use or a home use.

According to an embodiment of the present disclosure, an electronic device may include at least one of a furniture or a portion of a building/structure including a communication function, an electronic board, an electronic signature receiving device, a projector, or various measurement devices (for example, waterworks, electricity, gas, or radio wave measuring device, etc.). An electronic device according to the present disclosure may be a combination of one or more of the above-described devices. Also, it is understood a person of ordinary skill in the art that the electronic device according to the present disclosure is not limited to the above-described devices.

Hereinafter, an electronic device according to various embodiments of the present disclosure is described with reference to the accompanying drawings. A terminology of a user related to various embodiments discussed herein may indicate a person who uses an electronic device or a device (for example, an artificial intelligence electronic device) that uses the electronic device.

FIG. 1 is a view illustrating one way a network environment 100 may be embodied including an electronic device according to various embodiments of the present disclosure.

Referring now to FIG. 1, an electronic device 101 may include a bus 110, a processor 120, a non-transitory memory 130, an input/output (I/O) interface 140, a display 150, a communication interface 160, and a user interface module 170.

The bus 110 may be comprised of a circuit for connecting the above-described elements with each other, and transferring communication (for example, a control message) between the above-described elements.

The processor 120, which is comprised of circuitry configured for operation, may receive, for example, an instruction from the above-described other elements (for example, the memory 130, the I/O interface 140, the display 150, the communication interface 160, or the user interface module 170, etc.) via the bus 110, decipher the received instruction, and execute an operation or a data process corresponding to the deciphered instruction.

The memory 130 may store an instruction or data received from the processor 120 or other elements (for example, the I/O interface 140, the display 150, the communication interface 160, or the user interface module 170, etc.), or generated by the processor 120 or other elements. The memory 130 may include, for example, programming modules such as a kernel 131, a middleware 132, an application programming interface (API) 133, or an application 134. Each of the programming modules are configured for execution by hardware.

The kernel 131 may control or manage system resources (for example, the bus 110, the processor 120, or the memory 130, etc.) used for executing an operation or a function implemented in the rest of the programming modules, for example, the middleware 132, the API 133, or the application 134. Also, the kernel 131 may provide an interface for allowing the middleware 132, the API 133, or the application 134 to access an individual element of the electronic device 101 and control or manage the same.

With continued reference to FIG. 1, the middleware 132 may perform a mediation role so that the API 133 or the application 134 may communicate with the kernel 131 to give and take data. Also, in connection with task requests received from the applications 134, the middleware 132 may perform a control (for example, scheduling or load balancing) for a task request using, for example, a method of assigning priority that may use a system resource (for example, the bus 110, the processor 120, or the memory 130, etc.) of the electronic device 101 to at least one of the applications 134.

The API 133 is an interface that permits the application 134 to control a function provided by the kernel 131 or the middleware 132, and may include at least one interface or function (for example, an instruction) for file control, window control, image processing, or character control, etc.

According to various embodiments, the application 134 may include an SMS/MMS application, an e-mail application, a calendar application, alarm application, a health care application (for example, an application for measuring a quantity of motion or a blood sugar level or average, etc.), or an environmental information application (for example, an application providing atmospheric pressure, humidity or temperature information, etc.). Additionally or alternatively, the application 134 may be an application related to information exchange between the electronic device 101 and an external electronic device (for example, the electronic device 104). The application related to the information exchange may include, for example, a notification relay application for transferring specific information to the external electronic device or a device management application for managing the external electronic device.

For example, the notification relay application may include a function for transferring notification information generated from a different application (for example, an SMS/MMS application, an e-mail application, a health care application, or an environmental information application) of the electronic device 101 to an external electronic device (for example, the electronic device 104). Additionally or alternatively, the notification relay application may, for example, receive notification information from an external electronic device (for example, the electronic device 104) and provide the same to a user. The device management application may manage (for example, install, delete, or update) a function (for example, turn-on/turn-off of an external electronic device itself (or some constituent part) or luminance (or resolution) control of a display) and an application operating in the external electronic device or a service (for example, a communication service or a message service) provided by the external electronic device.

According to various embodiments of the present disclosure, the application 134 may include a designated application depending on an attribute (for example, a type of an electronic device) of the external electronic device (for example, the electronic device 104). For example, in the case where the external electronic device is an MP3 player, the application 134 may include an application related to music reproduction, particularly in MP3 format. Similarly, in the case where the external electronic device is a mobile medical health care device, the application may include an application related to health care. According to an embodiment, the application 134 may include at least one of an application designated in the electronic device 101 and an application received from the external electronic device (for example, the server 106 or the electronic device 104).

The I/O interface 140 may transfer an instruction or data received from a user via an I/O unit (for example, a sensor, a keyboard, or a touch screen) to the processor 120, the memory 130, the communication interface 160, or the user interface module 170 via the bus 110, for example. For example, the I/O interface 140 may provide data regarding a user's touch input via the touch screen to the processor 120. Also, the I/O interface 140, for example, may output an instruction or data received via the bus 110 from the processor 120, the memory 130, and the communication interface 160, or the user interface module 170 via the I/O unit (for example, a speaker or a display). For example, the I/O interface 140 may output voice data processed by the processor 120 to a user via a speaker.

The display 150 may display various information (for example, multimedia data or text data, etc.) to a user.

The communication interface 160 may facilitate communication between the electronic device 101 with an external device (for example, the electronic device 104 or the server 106). For example, the communication interface 160 may be connected with a network 162 via wireless communication or wired communication so as to communicate with the external device. The wireless communication may, for example, include at least one of Wireless Fidelity (Wi-Fi), Bluetooth (BT), Near Field Communication (NFC), Global Positioning System (GPS), or cellular communication (for example, LTE, LTE-A, CDMA, WCDMA, UMTS, WiBro, or GSM, etc.). The wired communication may include, for example, at least one of Universal Serial Bus (USB), High Definition Multimedia Interface (HDMI), recommended standard 232 (RS-232), and plain old telephone service (POTS).

According to an embodiment, the network 162 may be a telecommunications network. More particularly, the telecommunications network may include at least one of a computer network, the Internet, an Internet of things, and a telephone network. According to an embodiment, a protocol (for example, a transport layer protocol, a data link layer protocol, or a physical layer protocol) for communication between the electronic device 101 and an external device may be supported by at least one of the application 134, the application programming interface 133, the middleware 132, the kernel 131, or the communication interface 160.

The user interface module 170 may recognize a neighboring circumstance which the electronic device 101 encounters, detects, etc., for example, after transmitting, detecting an amount of a current (or an amount of a current lost from at least one antenna) returning from at least one antenna (for example, an NFC antenna), and set a user interface regarding this detected current. An artisan understands and appreciates that a detected wireless power of a return signal, i.e. a returned signal strength may be detected as an alternative detection of an amount of current, and this variation is within the breadth of the claimed invention. The user interface module 170 may control at least a portion of functions of the electronic device 101 so that the electronic device 101 may communicate with another electronic device (for example, the electronic device 104 or the server 106) using, for example, the processor 120 or independently. Alternatively, the user interface module 170 may be included in the processor 120. Additional information regarding the user interface module 170 is provided with reference to FIG. 2 and subsequent drawings.

Figure 2:
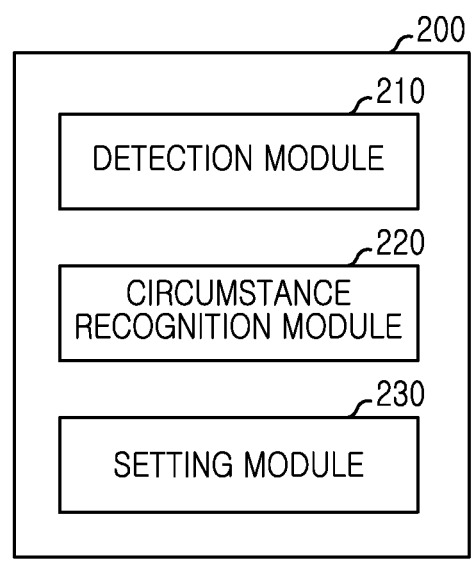
FIG. 2 is a block diagram illustrating a user interface module of an electronic device according to various embodiments of the present disclosure.

FIG. 2 is a block diagram illustrating a user interface module 170 of an electronic device (for example, the electronic device 101) according to various embodiments of the present disclosure.

Referring now to FIG. 2, the user interface module 170 may include a detection module 210, a circumstance recognition module 220, and a setting module 230.

The detection module 210 (for a non-limiting example, an NFC controller 1050 of FIG. 10, at least one sensor or application processor, etc.) may detect an amount of a current (referred to as an amount of a 'returning current' or an amount of 'a non-loss current',) returning to the electronic device after passing through at least one antenna (for example, a cellular antenna or a Wireless Connectivity "WC" antenna, etc.).

For example, a main circuit board (not shown) provides a current to at least one antenna, and a current circulates along a radiation pattern formed by at least one antenna and then the current returns to the main circuit board, and a transmission line formed in this manner may transmit or receive a radio electromagnetic wave. Here, an amount of a returning current may indicate an amount of a current returning from at least one antenna to the main circuit board. The amount of the returning current may be calculated as an average for a set time. When an amount of a current returning is relatively small, an amount of a current loss in at least one antenna is relatively large.

The detection module 210 may detect an amount of a current returning t in an operation section where a current is supplied to at least one antenna. For example, the detection module 210 may measure an amount of a current returning in the case where a current is periodically supplied to an NFC antenna during a read/write mode of an NFC function.

The circumstance recognition module 220 (for example, at least one sensor or application processor, etc.) may recognize a neighboring circumstance (for example, a type of an approaching member, an approach position, an approach distance, or an approach range, etc.) as corresponding to an amount of a returning current. The circumstance recognition module 220 may set a range of an amount of current returning for each of the various neighboring circumstances, and determine a neighboring circumstance for a returning current amount that falls within a specified range. For example, in the case where a user grips the electronic device 101, the circumstance recognition module 220 may output a signal regarding an amount of gripping of a handheld device, or a gripping position, etc. from the returning current amount.

The setting module 230 (for example, an application processor) may perform setting (control or loading) (for example, display control, voice control, shooting control, or wireless communication control, etc.) of at least one user interface corresponding to a recognized neighboring circumstance. For example, the user interface may include a device configuration of hardware or firmware that gives an aid so that interaction between a user and the electronic device 101 may be swiftly performed. The user interface may be at least a portion of a machine executable code where a user and the program interact with each other in order to exchange information between the user and the electronic device 101. The setting module 230 may display a recognized neighboring circumstance.

The setting module 230 may include the circumstance recognition module 220 with the same configured circuitry.

In another embodiment, the detection module 210 may detect a loss in the amount of current returning from the at least one antenna, the circumstance recognition module 220 may determine a neighboring circumstance corresponding to the amount of current lost, and the setting module 230 may set a user interface corresponding to the neighboring circumstance.

In still another embodiment, the detection module 210 may detect a loss rate of current from at least one antenna, the circumstance recognition module 220 may determine a neighboring circumstance corresponding to the loss rate of current (or alternatively, power), and the setting module 230 may set a user interface corresponding to the neighboring circumstance.

Figure 3:
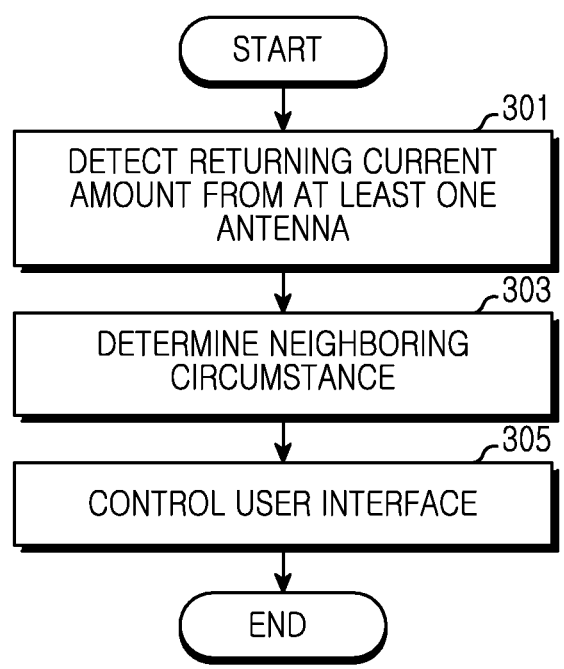
FIG. 3 is a flowchart illustrating an operational procedure for setting a user interface according to various embodiments of the present disclosure.

FIG. 3 is a flowchart illustrating a procedure for setting a user interface according to various embodiments of the present disclosure.

Referring now to FIG. 3, at operation 301, the user interface module 170 (for example, the detection module 210) may detect a returning amount of current from at least one antenna.

At operation 303, the user interface module 170 (for example, the circumstance recognition module 220) may recognize a neighboring circumstance (for example, whether a user grips the handheld electronic device, a user's gripping amount (force, or amount of the device held), a user's gripping position, whether a metal body approaches, a metal body approach distance from the electronic device, a metal body approach position or whether an NFC tag approaches, etc.) corresponding to a returning current amount.

Figure 9:
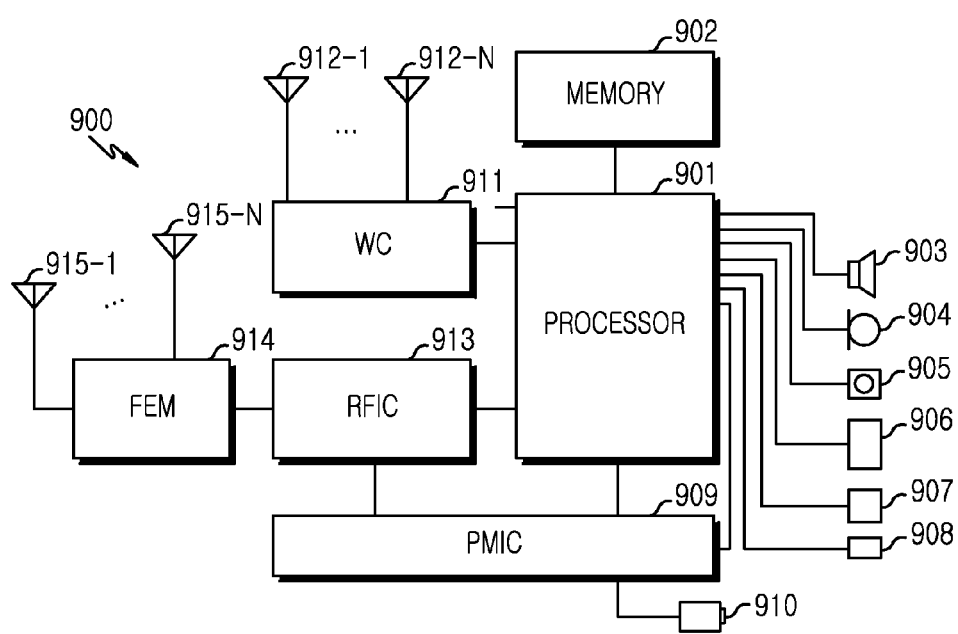
FIG. 9 is a block diagram illustrating hardware associated with a UE according to various embodiments of the present disclosure.

At operation 305, the user interface module 170 (for example, the setting module 230) may set (for example, display control, voice control, shooting control, or wireless communication control, etc.) at least one user interface corresponding to a recognized neighboring circumstance. For example, the user interface module 170 may control transmission (Tx) power to at least one cellular antenna 915-N (such as shown in FIG. 9) or select at least one cellular antenna used for cellular communication among a plurality of cellular antennas 915-N in response to a recognized neighboring circumstance. Alternatively, in case of receiving a call in response to a recognized neighboring circumstance, the user interface module 170 may switch between call receive warning modes (for example, a bell sound mode, a mute lamp mode, or a vibration mode, etc.). Alternatively, the user interface module 170 may switch between communication modes (for example, switching from a general phone mode or a speaker phone mode, etc.) in response to a recognized neighboring circumstance.

Figure 4:
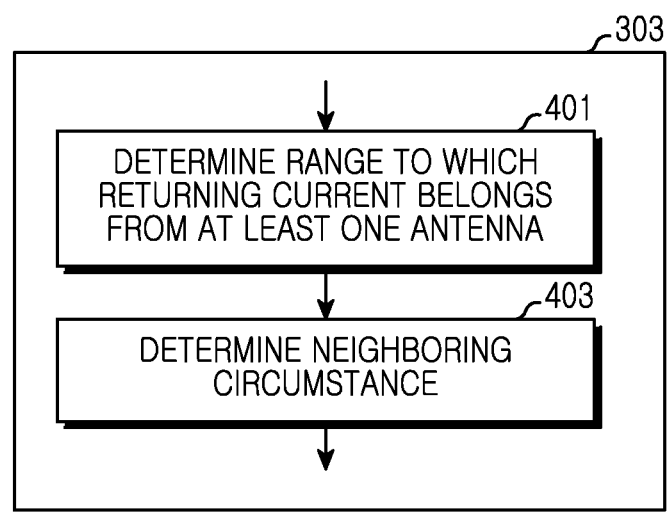
FIG. 4 is a flowchart illustrating a neighboring circumstance recognizing procedure of process 303 of FIG. 3 according to various embodiments of the present disclosure.

FIG. 4 is a flowchart illustrating a neighboring circumstance recognizing procedure of process 303 of FIG. 3 according to various embodiments of the present disclosure.

Referring now to FIG. 4, at operation 401 the user interface module 170 (for example, the circumstance recognition module 220) may determine a range to which a returning amount of current detected from at least one antenna belongs.

At operation 403, the user interface module 170 (for example, the circumstance recognition module 220) may determine a neighboring circumstance corresponding to a determined range.

Figure 5:
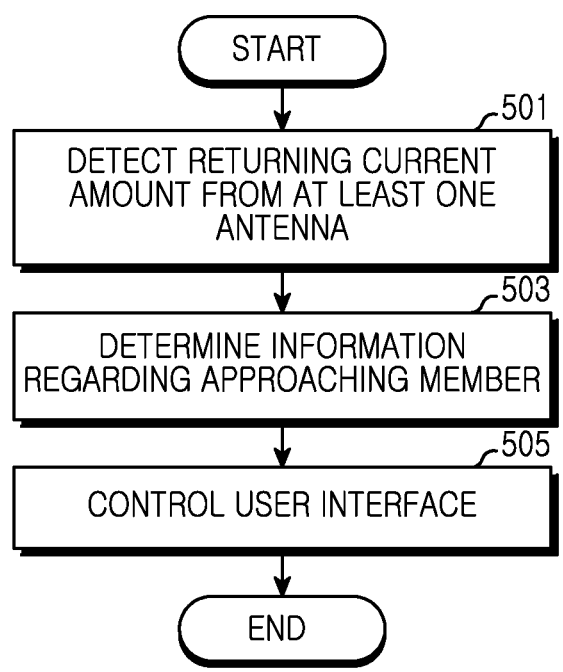
FIG. 5 is a flowchart illustrating a procedure for setting a user interface according to various embodiments of the present disclosure.

FIG. 5 is a flowchart illustrating a procedure for setting a user interface according to various embodiments of the present disclosure.

Referring now to FIG. 5, at operation 501 the user interface module 170 (for example, the detection module 210) may detect a returning current amount from at least one antenna.

At operation 503, the user interface module 170 (for example, the circumstance recognition module 220) may determine information (for example, a type of an approaching member, an approach position, an approach distance, or an approach range, etc.) regarding an approaching member corresponding to a returning current amount.

At operation 505, the user interface module 170 (for example, the setting module 230) may set (for example, display control, voice control, shooting control, or wireless communication control, etc.) a user interface corresponding to information regarding an approaching member.

Figure 6:
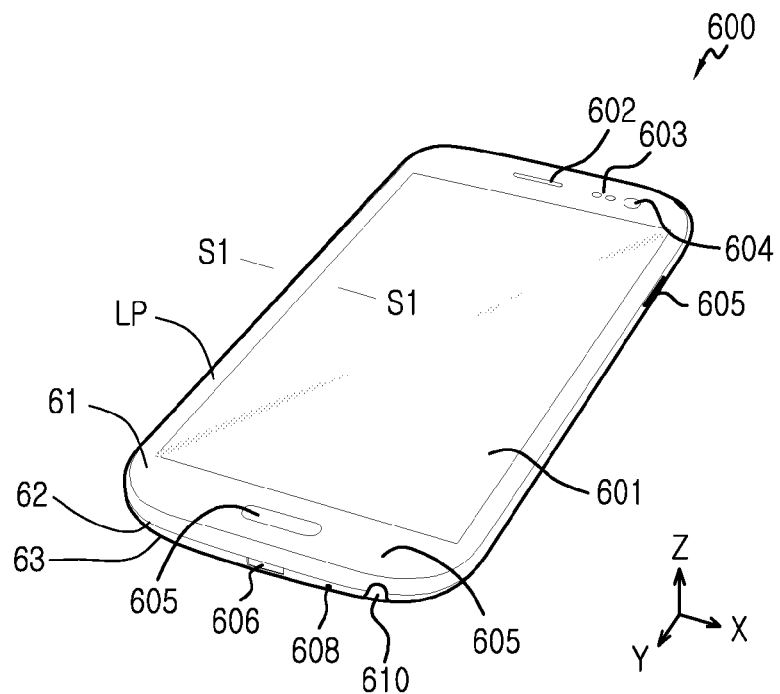
FIG. 6 is a view illustrating an electronic device according to various embodiments of the present disclosure.

FIG. 6 is a view illustrating a perspective view of an electronic device according to various embodiments of the present disclosure.

Referring now to FIG. 6, the electronic device 600 may include a touch screen 601, a speaker 602, at least one sensor 603, a camera 604, at least one key 605, a socket 606, a microphone 608, an internal antenna (not shown), or a stylus 610. The electronic device 600 may include a front surface 61, a lateral side 62, and a backside 63.

The touch screen 601 may display an image and receive a touch input. The touch screen 601 may be disposed on the front surface 61 of the electronic device 600.

The speaker 602 is a transducer that may convert an electric signal into vibrations that are output in the form of a sound. The speaker 602 may be disposed in the front surface 61 of the electronic device 600. Alternatively, though not shown, the speaker 602 may be disposed on the lateral side 62 or the backside 63 of the electronic device 600.

The at least one sensor 603 may measure a physical quantity or detect an operational state of the electronic device 600 to convert measured or detected information into an electric signal. The at least one sensor 603 may include at least one of a gesture sensor, a proximity sensor, a grip sensor, a gyro sensor, an acceleration sensor, a geomagnetic sensor, an atmospheric pressure sensor, a temperature/humidity sensor, a Hall sensor, an RGB (red, green, blue) sensor, an illuminance sensor, a living body sensor, an ultraviolet (UV) sensor, or a stylus detector, just to name some non-limiting possibilities.

The camera 604 may shoot an image and a moving picture. The camera 604 may be disposed on the front surface 61 of the electronic device 600. Alternatively, though not shown, the camera 604 may be disposed on the lateral side 62 or the backside 63 of the electronic device 600.

The at least one key 605 may include a pressing type or touch type key.

The at least one socket 606 (for example, an ear jack, a charging jack, or a communication jack, etc.) may be an interface device for electric connection with an external device (for example, an ear set or a charger, etc.). The at least one socket 606 may include a structure for connecting with a plug such as a high-definition multimedia interface (HDMI), a universal serial bus (USB), a projector, or a D-subminiature (D-sub), etc. Though not shown, the at least one socket 606 may be disposed on the lateral side 62 or the backside 63 of the electronic device 600.

The microphone 608 may convert a sound into an electric signal. The microphone 608 may be disposed on the lateral side 62 of the electronic device 600.

Alternatively, though not shown, the microphone 608 may be disposed on the front surface 61 or the backside 63 of the electronic device 600.

With continued reference to FIG. 6, the stylus 610 may be an input tool for making a digitizer panel (not shown) of the touch screen 601 sensitive. For example, the stylus 610 may operate in an electromagnetic induction method. The stylus 610 may be detached to the outside via an opening formed in the lateral side 62 of the electronic device 600.

Figure 7:
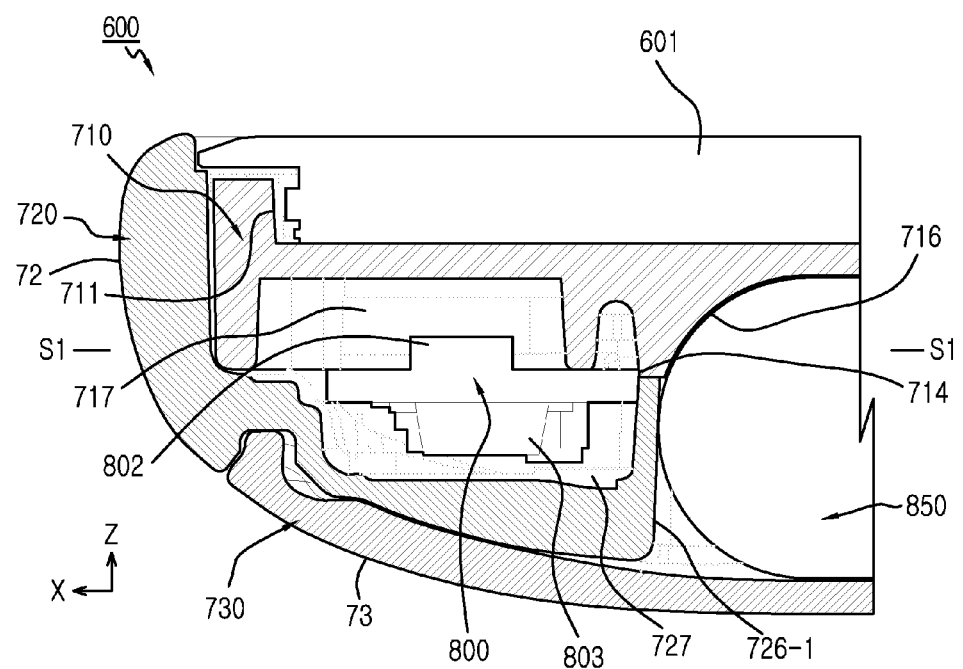
FIG. 7 is a cross-sectional view illustrating an electronic device according to various embodiments of the present disclosure.

FIG. 7 is a cross-sectional view illustrating an electronic device 600 according to various embodiments of the present disclosure. A portion S1-S1 may include a left edge portion LP of the electronic device 600.

Referring now to FIG. 7, the electronic device 600 may include a touch screen 601, a bracket 710, a rear case 720, a battery cover 730, a primary circuit board 800 (a main board or a motherboard or a Printed Circuit Board "PCB"), or a battery pack 850.

The touch screen 601 may include a window (not shown), a touch panel, a display panel, or a digitizer panel.

The bracket 710 may be a mounting plate to which a plurality of electronic parts may be installed. for example, the bracket 710 may be a frame that may fix and support a plurality of electronic parts. The bracket 710 may include a first side formed on an upper portion and a second side formed on a lower portion. The first side and the second side of the bracket 710 may be a mounting surface for mounting an electronic part thereon. The first side and/or the second side of the bracket 710 may include various shapes of surfaces such as a flat surface, a curved surface, an oblique surface, etc. The bracket 710 may provide a seat for the touch screen 601 that is arranged thereon. The bracket 710 on an opposite side may also seat the primary circuit board 800 thereon. The bracket 710 may seat electronic parts including a PCB thereon. The bracket 710 may seat an electronic part connected to the primary circuit board 800 by the medium of an electric connection means (for example, a cable or a Flexible Printed Circuit Board "FPCB", etc.) thereon. The bracket 710 may include a plurality of recesses that may seat a plurality of parts therein. For example, the bracket 710 may include a recess 711 that may seat the touch screen 601 therein. The bracket 710 may include a recess 714 that may seat the primary circuit board 800 therein. The bracket 710 may include a recess 717 that may receive electronic parts 802 protruding from the primary circuit board 800 to an upper direction. The bracket 710 may include a battery pack receiving recess 716 of a container shape which is concave in the lower direction, for receiving a portion of the battery pack 850 in a lower portion.

With continued reference to FIG. 7, the rear case 720 may be coupled (for example, snap-fit fastening or bolt fastening) to the bracket 710. Alternatively, according to various embodiments, the rear case 720 may not exist as a piece separate from the battery cover 730 and may exist as an integral type with the battery cover 730. The rear case 720 may hide a plurality of parts fixed to the bracket 710. The rear case 720 may hide at least a portion of the primary circuit board 800 fixed to the bracket 710. The bracket 710, the rear case 720, and the primary circuit board 800 may be coupled together in a bolt-fastening manner. The rear case 720 may include a recess 727 that may receive electronic parts 803 protruding from the primary circuit board 800 toward a lower direction opposite the surface of the touch screen 601. The rear case 720 may include a battery pack through portion 726-1 that may allow the battery pack 850 to pass through it. As illustrated, the battery pack through portion 726-1 may be an opening shape that passes through the upper portion and the lower portion of the rear case 720, and may communicate with a battery pack receiving recess 716 of a container shape of the bracket 710. In the case where the bracket 710 is coupled to the rear case 720, the battery pack receiving recess 716 of the bracket 710 and the battery pack through portion 726-1 of the rear case 720 may prepare a container-shaped space that may receive the entire battery pack 850. The battery pack through portion 726-1 of the rear case 720 may be a container shape that may receive the entire battery pack 850 in itself and the battery pack receiving recess 716 of the bracket 710 may not be necessary. Also, the battery pack receiving recess 716 may be a container shape that may receive the entire battery pack 850 in itself and the battery pack through portion 726-1 of the rear case 720 may not be necessary.

The battery cover 730 is attachable/detachable to/from the rear case 720. The battery cover 730 may include a plurality of hooks (not shown) that may be fastened to a plurality of hook fasten recesses of the rear case 720 in its edge. Other constructions for attachment and detachment of the battery cover can also be used.

In the case where all of the bracket 710, the rear case 720, and the battery cover 730 are coupled, an exposed surface of at least a portion of these parts may form an external surface of the electronic device 600. For example, the rear case 720 may form the lateral side 62 of the electronic device 600 shown in FIG. 6. Also, the battery cover 730 may form the backside 63 of the electronic device 600 (see FIG. 6).

The primary circuit board 800 may be a board on which a basic circuit and a plurality of electronic parts have been mounted, including integrated circuits. The primary circuit board 800 may set an execution environment of the electronic device 600, maintain information thereof, and allow the electronic device 600 to be stably driven. Also, the primary circuit board 800 may allow data input/output exchange of all units of the electronic device 600 to be swiftly performed.

In addition, the primary circuit board 800 may be disposed between the bracket 710 and the rear case 720. The primary circuit board 800 may be coupled to the bracket 710 using a fastening method such as a bolt.

Figure 8:
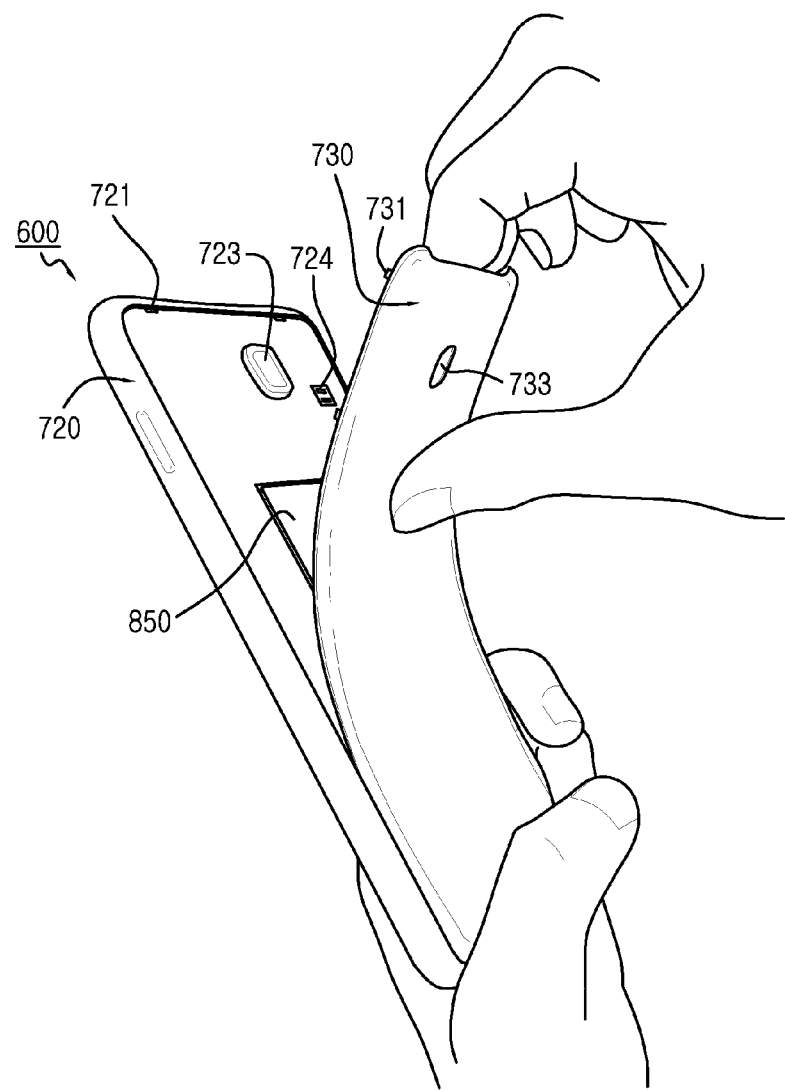
FIG. 8 is a view illustrating an electronic device according to various embodiments of the present disclosure.

FIG. 8 is a view illustrating an electronic device according to various embodiments of the present disclosure.

Referring now to FIG. 8, the electronic device 600 may include the rear case 720 and the battery cover 730.

The rear case 720 may include a plurality of hook fastening recesses 721, a camera window 723, and a plurality of terminals 724. The plurality of hook fastening recesses 721 may be used for hook coupling with the battery cover 730. The camera window 723 may be disposed to correspond to a camera (not shown) mounted on the primary circuit board 800 (of FIG. 6). The plurality of terminals 724 may be electrically connected to an NFC related part (for example, an NFC controller) mounted on the primary circuit board 800. The plurality of terminals 724 may be electrically connected to an NFC antenna (not shown) of the battery cover 730.

The battery cover 730 may include a plurality of hooks 731, a camera window hole 733, and an antenna (for example, an NFC antenna) (not shown). The plurality of hooks 731 may be coupled to the plurality of hook fastening recesses 721 of the rear case 720. The camera window hole 733 may allow the camera window 723 of the rear case 720 to pass through it. The NFC antenna may receive an electric signal (a current) from an NFC controller of the primary circuit board 800 to radiate the same. The battery cover 730 may include a plurality of terminals (not shown) which may be electrically connected with the NFC antenna and which may electrically contact the plurality of terminals 724 of the rear case 720 on its surface.

The battery cover 730 may be elastically warp-transformed.

Alternatively, though not shown, the NFC antenna may be disposed in various positions besides the battery cover 730. For example, the NFC antenna may be attached to the battery pack 850. A plurality of terminals are provided for supplying power, and a plurality of terminals electrically connected to the NFC antenna may be mounted together on the surface of the battery pack 850. The rear case 720 may include terminals that may be electrically connected to the plurality of terminals of the battery pack 850.

The NFC antenna may have conducting paint for a coating, or a metal plate for attachment, etc. The NFC antenna may be used as a detection medium that may detect a neighboring circumstance (for example, user gripping, metal body approaching, or NFC tag recognition, etc.) which the electronic device 600 faces. For example, in the case where a user grips the electronic device 600, the user's hand (i.e. detection object) interferes with an electric field formed in the NFC antenna, and a portion of the electric field may be connected in a grounded state. Thus, an NFC controller may detect an amount of a current change or a capacitance change, etc. corresponding to this change of the electric field. An amount of a current change at the NFC antenna may be different depending on a method with the user grips the electronic device 600 or a portion of the electronic device 600 gripped by the user. The amount of the current change may be a concept including the above-described returning current amount.

FIG. 9 is a block diagram illustrating UE according to various embodiments of the present disclosure.

Referring now to FIG. 9, user equipment (UE) 900 (for example, the electronic device 101) may include a processor 901, a memory 902, a speaker 903, a microphone 904, a camera 905, a display 906, a touch panel 907, a sensor 908, a Power Manager Integrated Circuit (PMIC) 909, a battery 910, a wireless connectivity (WC) 911, at least one WC antenna 912-N, a Radio Frequency Integrated Circuit (RFIC) 913, a Front End Module (FEM) 914, and at least one cellular antenna 915-N.

The processor 901, which comprises hardware such as configured circuitry and may referred to as control unit or controller, may control an overall operation of the UE 900. The processor 901 may include integrated circuitry and is configured to perform functions of executing an Operating System (OS) of the UE 900 and an application, and controlling other parts and devices (a.k.a. "controller").

The processor 901 may include one or more of:

an Application Processor (AP) for performing a core function of an overall system, a Communication Processor (CP) for performing communication, a Graphic Processing Unit (GPU) for processing 2-dimensional (D) and 3-dimensional (D) graphics, an Image Signal Processor (ISP) responsible for image signal processing, an Audio Signal Processor (ASP) responsible for voice signal processing, a memory semiconductor, or a system interface, etc. The processor 901 may be a System on Chip (SoC) where various parts are integrated in one chip.

The AP may play a role of a "brain" of the UE 900, and support an operation processing function, a contents reproduction function of various formats such as audio, an image, a video, etc., a graphic engine, etc. The AP may drive an OS applied to the UE 900 and various functions, etc. and perform a plurality of functions such as a core, a memory, a display system/controller, a multimedia encoding/decoding codec, a 2D/3D accelerator engine, an ISP, a camera, audio, a modem, various kinds of high & low speed Serial/Parallel connectivity interface, etc. The AP may execute various software programs (an instruction set) stored in the memory 902 to perform various functions for the UE 900, and perform processes and controls for voice communication, video communication, and data communication. The AP may perform a software program (an instruction set) stored in the memory 902 to perform various functions corresponding to the program. The AP may be a system on chip integrating all of a GPU, an ISP, an ASP, a memory semiconductor, and a system interface.

The CP enables voice communication and/or data communication, and compresses voice data and image data or decompresses compression of voice data and image data. The CP may be a baseband modem or a baseband processor (BP), etc. The CP may be designed to operate via one of a Global System for Mobile Communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network, or a Bluetooth network.

The GPU processes an operation related to graphics, and may be responsible for image information processing, acceleration, signal switching, screen output, etc. The GPU may resolve a bottle neck phenomenon generated by a graphic task of the AP, and process 2D or 3D graphics faster than the AP.

The ISP may convert an electric signal (image data) from the camera 905 to an image signal. The image data of the camera may be provided by a CCD or CMOS sensor. The ISP may change the color of image data from the camera 905 and adjust brightness such that it is the same as an actual image. The ISP may perform automatic exposure (AE) correction, automatic white balance (AWB) correction that automatically adjusts a white balance depending on a color temperature change of incident light, and automatic focusing (AF) that allows an object to be automatically focused, etc. The ISP may analyze a frequency component of image data obtained from the camera 905, and recognize definition of an image to adjust an F number of an aperture and a shutter speed of the camera 905. The ISP may temporarily store image data from the camera 905 in the memory 902 (for example, a buffer memory).

With continued reference to the processor 901 and possible items arranged therein, the APU processes an audio-related operation, and changes an audio signal of a digital or analog form via an audio effect or an effect unit.

The memory 902, which comprises a non-transitory machine readable medium, may store a software-related program (an instruction set) executable by the above-described processors. The memory 902 may include a high speed random access memory such as one or more magnetic disk storage devices and/or a non-volatile memory, one or more optical storage devices and/or a flash memory (for example, NAND, NOR).

The software that is executed by the processor may include an OS program, a communication program, a camera program, a graphics program, one or more applications, a user interface program, a codec program, an antenna self-test program, or a neighboring circumstance recognition program, etc. A terminology of a program may be also expressed as a set of instructions or an instruction set. The OS program may use various functions of a communication program, a camera program, a graphic program, one or more applications, a user interface program, a codec program, an antenna test program, or a neighboring circumstance recognition program via various Application Programming Interfaces (APIs).

The OS program may be any of, for example, WINDOWS, LINUX, Darwin, RTXC, UNIX, OS X, or a built-in OS such as VxWorks, and may include various software elements controlling a general system operation. A control of this general system operation may include memory management and control, storage hardware (device) control and management, power control and management, etc. Also, the OS program may perform a function for swift communication between various hardwares (devices) and software elements (programs).

The communication program may enable communication with a computer, a server, and UE, etc. via the WC 911 or the RFIC 913, or an external port.

The camera program may perform a pre-process that applies various effects to an image from an image sensor of the camera 905, and a post-process that applies various effects to a captured snap image under API support such as Open Graphics Library (OpenGL), DirectX, etc.

The graphic program may include various software elements for providing and displaying graphics to the display

906. The graphic program may generate graphics based on an API such as OpenGL, DirectX, etc., and provide various filters that may give various effects to an image. A terminology of graphics indicates text, a web page, an icon, a digital image, a video, animation, etc. This graphic program may be an image viewer, an image edit program, etc. whose usage is optimized for post-processing an image, and may be a camera-related program, a video phone-related program, etc. optimized for pre-processing an image. The graphic program may perform post-processing that applies various effects to a rendering-completed image, or perform pre-processing that applies various effects to an image. As described above, filters for these effects may be collectively managed so that they may be used in common.

The application may include one or more of a browser, an e-mail, an instant message, word processing, keyboard emulation, an address book, a touch list, a widget, Digital Right Management (DRM), voice recognition, voice duplication, position determining function, a location based service, etc. The user interface program may include various software elements related to a user interface that are executed by hardware. The user interface program may include content regarding how a state of a user interface changes and a condition under which a state of a user interface changes.

The codec may also include machine executable code related to encoding and decoding of a video file.

The antenna test program may output information from the WC 911 indicating an operation state of at least one WC antenna 912-N via the processor 901 and an output unit (for example, the display 907 or the speaker 903).

The neighboring circumstance recognition program may adjust transmission (Tx) power to at least one cellular antenna 915-N in response to a state signal from the WC 911. The neighboring circumstance recognition can configure hardware to select at least one used for cellular communication from a plurality of cellular antennas in response to a state signal from the WC 911. The neighboring circumstance recognition program may connect at least one antenna matching circuit to the RFIC 913 in response to a state signal from the WC 911. In case of receiving a call, the neighboring circumstance recognition program may switch a call receive mode (for example, a bell sound mode, a mute lamp mode, or a vibration mode, etc.) in response to a state signal from the WC 911. The neighboring circumstance recognition program may switch a communication mode (for example, a general phone mode or a speaker phone mode, etc.) in response to a state signal from the WC 911.

The memory 902 may further include additional machine executable code (instructions) besides the above-described items. Also, various functions of the UE 900 may be executed by one or more stream processings, and/or a hardware including an Application Specific Integrated Circuit (ASIC).

The speaker 903 may convert an electric signal to a sound in an audio frequency band and output the same. The microphone 904 may convert a sound wave transferred from a person or other sound sources to an electric signal.

The camera 905 may convert light reflected by a photographed object to an electric signal. The camera 905 may include an image sensor such as a Charged Coupled Device (CCD) or a Complementary Metal-Oxide Semiconductor (CMOS), etc. The image sensor may perform a camera function such as a photo, video clip recording, etc. The image sensor may change a hardware configuration of the camera 905, for example, by adjusting lens movement, an F number of an aperture, etc., depending on a camera program executed by the AP 901.

The display 906 may output an electric signal in the form of visual information (for example, text, graphic, video, etc.) The display 906 may be one of an Electro Wetting Display (EWD), E-Paper, a Plasma Display Panel (PDP), a Liquid Crystal Display (LCD), an Organic Light Emitting Diode (OLED), or an Active Matrix Organic Light Emitting Diodes (AMOLED), just to name a few non-limiting possibilities.

With continued reference to FIG. 9, the touch panel 907 may receive and detect a touch input. The touch panel 907 may be one of a digitizer for a stylus pen, a capacitive overlay touch panel, a resistance overlay touch panel, a surface acoustic wave touch panel, and an infrared beam touch panel.

The sensor 908 may detect, discriminate, and measure a physical quantity such as heat, light, temperature, pressure, a sound, or a position, or a change thereof of any of the aforementioned. The sensor 908 may include a temperature sensor, a pressure sensor, a magnetic sensor, a light sensor, a sound sensor, a capacitance sensor, or a Global Positioning System (GPS) sensor, etc., just to name some non-limiting possibilities.

The PMIC 909 may adjust power from the battery 910. For example, the processor 901 may transmit an interface signal to the PMIC 909 in accordance with a load to be processed. The PMIC 909 may adjust a core voltage supplied to the processor 901 so that the voltage is suitable for the processor 901, and the processor 901 may be always driven using minimum power. The PMIC 909 may be configured as at least one PMIC related to at least one of the WC 911, the memory 902, the speaker 903, the microphone 904, the camera 905, the display 906, or the touch panel 907, etc. as well as the processor 901. One unified PMIC may be configured, and the unified PMIC may adjust battery power for at least one of the above-described elements.

The WC 911 may implement various communication functions not processed by the processor 901, for example, one or more of Wi-Fi, Bluetooth, Near Field Communication (NFC), Universal Serial Bus (USB), or a Global Positioning System (GPS), etc. The WC 911 may mount a Wi-Fi controller for using Wi-Fi, a Bluetooth controller for using Bluetooth, an NFC controller for using NFC, a USB controller for using USB, or a GPS controller for a GPS function. The WC 911 may generate an RF signal corresponding to a signal received from the processor 901, and transmit the generated RF signal to the outside via at least one WC antenna 912-N. The WC 911 may generate a signal corresponding to an RF signal received via at least one WC antenna 912-N to transmit the same to the processor 901. The WC 911 may determine whether input data occurs via at least one WC antenna 912-N. When a user allows the UE 900 to approach an external device (for example, a card reader or external UE), the WC 911 may receive input data from the external device via at least one WC antenna 912-N.

The WC 911 may measure an amount of a current change (for example, an amount of a current loss) in at least one WC antenna 912-N (for example, an NFC antenna, a BT antenna, or a GPS antenna, etc.), generate a state signal corresponding to an amount of a current loss, and transmit the generated state signal to the processor 901. This state signal may indicate an operation state of at least one WC antenna 912-N, or a neighboring circumstance (for example, whether a user grips, a user's gripping amount, a user's gripping position, whether a metal body approaches, a metal body approach distance, a metal body approach position, etc.) which the UE 900 faces.

The WC 911 may measure an amount of a current loss in a section where a current is periodically output to at least one WC antenna 912-N. For example, the WC 911 may generate a state signal in a section where a current is periodically supplied to an NFC antenna during a Reader/Writer mode of an NFC function. The WC 911 may generate a state signal in a section where a current is periodically supplied to the NFC antenna in a self test that checks an operation state of at least one WC antenna 912-N. The WC 911 may generate a state signal corresponding to a range to which an amount of a current loss in at least one WC antenna 912-N belongs. The processor 901 may perform at least one operation in response to a state signal from the WC 911.

With continued reference to FIG. 9, it is known that at least one WC antenna 912-N may be used for at least one communication among Wi-Fi, Bluetooth, Near Field Communication (NFC), or a Global Positioning System (GPS).

The RFIC 913 (for example, an RF transceiver) may receive a radio wave from a base station, and modulate the received high frequency wave as a baseband that may be processed by a modem (for example, a CP). The RFIC 913 may modulate a low frequency wave processed by the modem as a high frequency wave in order to transmit the same to a base station.

The FEM 914 may be a transmission/reception device that may control a radio wave signal. The FEM 914 may connect at least one cellular antenna 915-N with the RFIC 913, and separate a transmission/reception signal. The FEM 914 may perform filtering and amplification, and include a reception end front end module mounting a filter that filters a reception signal therein, and a transmission end front end module mounting a Power Amplifier Module (PAM) that amplifies a transmission signal therein.

At least one cellular antenna 915-N may be used for at least one communication among Single Input Multiple Output (SIMO), Multiple Input Single Output (MISO), diversity, or Multiple Input Multiple Output (MIMO).

Figure 10:
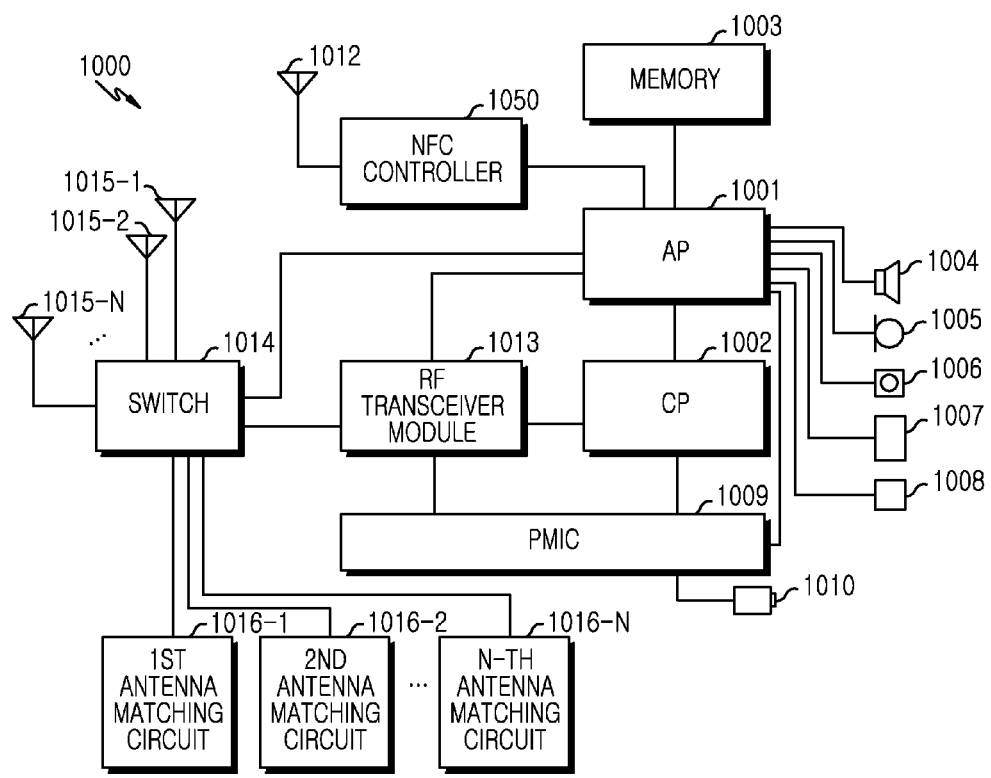
FIG. 10 is a block diagram illustrating hardware associated with a UE according to various embodiments of the present disclosure.

FIG. 10 is a block diagram illustrating UE according to various embodiments of the present disclosure.

Referring to now FIG. 10, UE 1000 may include an application processor 1001, a communication processor 1002, a non-transitory memory 1003, a speaker 1004, a microphone 1005, a camera 1006, a display 1007, a touch panel 1008, a PMIC 1009, a battery 1010, an NFC controller 1050, an NFC antenna 1012, an RF transceiver module 1013, a switch 1014, a plurality of cellular antennas 1015-N, and a plurality of antenna matching circuits 1016-N.

The application processor (AP) 1001 which includes hardware circuitry configured for operation, may play a role of a brain (i.e. a "controller") of the UE 1000, and support an operation processing function, a contents reproduction function of various formats such as audio, an image, a video, etc., a graphic engine, etc. The AP 1001 may drive an OS applied to the UE 1000 and various functions, etc. and may be one chip that gathers all of numerous functions such as a core, a memory, a display system/controller, a multimedia encoding/decoding codec, a 2D/3D accelerator engine, an ISP, a camera, audio, a modem, various kinds of high & low speed Serial/Parallel connectivity interface, etc. The AP 1001 may be embodied as a System-On-Chip (SOC) that drives an OS and applications, and gathers functions of controlling various system devices/interfaces in one chip.

The Communication Processor (CP) 1002 enables voice communication and/or data communication, and compresses voice data and image data or decompresses compression of voice data and image data. The CP 1002 may be a baseband modem or a baseband processor (BP), etc. The CP 1002 may be designed to operate via one of a Global System for Mobile Communication (GSM) network, an Enhanced Data GSM Environment (EDGE) network, a Code Division Multiple Access (CDMA) network, an Orthogonal Frequency Division Multiple Access (OFDMA) network, a W-CDMA network, an EV-DO network, an HSDPA network, a Long Term Evolution (LTE) network, a Wireless Fidelity (Wi-Fi) network, a WiMax network, a GPS network, a Bluetooth network, or an NFC network, just to name a few non-limiting possibilities.

With continued reference to FIG. 10, the memory 1003 may store a software-related program (an instruction set) executable by the above-described processors. The memory 1003 may include a high speed random access memory such as one or more magnetic disk storage devices and/or a non-volatile memory, one or more optical storage devices and/or a flash memory (for example, NAND, NOR). The software may include an OS program, a communication program, a camera program, a graphics program, one or more applications, a user interface program, a codec program, an antenna test program, or a neighboring circumstance recognition program, etc. A terminology of a program may be also expressed as a set of instructions or an instruction set or a program. The OS program may use various functions of a communication program, a camera program, a graphic program, one or more applications, a user interface program, a codec program via various Application Programming Interfaces (APIs). The memory 1003 may further include an additional program (instructions) besides programs.

The speaker 1004 may convert an electric signal to a sound in an audio frequency band and output the same. The microphone 1005 may convert a sound wave transferred from a person or other sound sources to an electric signal.

The camera 1006 may convert light reflected by a shoot object to an electric signal. The camera 1006 may include a CCD or a CMOS, etc.

The display 1007 may output an electric signal in the form of visual information (for example, text, graphic, video, etc.) The display 1007 may be one of an EWD, an E-Paper, a PDP, an LCD, an OLED, or AMOLED, just to name some non-limiting possibilities.

The touch panel 1008 is designed to detect when a touch is received. It is also within the term "touch" that a "near touch", one's finger or stylus coming within a distance sufficient close to as to be detectable by the touch screen without physical contact may also be sufficient for registering a touch. The touch panel 1008 may be one of a digitizer for a stylus pen, a capacitive overlay touch panel, a resistance overlay touch panel, a surface acoustic wave touch panel, and an infrared beam touch panel.

The PMIC 1009 may adjust power from the battery 1010.

The NFC controller 1050 may generate a reception signal corresponding to an RF reception signal received via the NFC antenna 1012 to transmit the same to the AP 1001. The NFC controller 1050 may generate an RF transmission signal corresponding to a transmission signal received from the AP 1001 and transmit the generated RF transmission signal to the outside via the NFC antenna 1012. The NFC controller 1050 may measure an amount of a current change (for example, an amount of a current loss) in the NFC antenna 1012. When a current flows through the NFC antenna 1012, an electric field may be formed. In the case where a user grips UE, the user's hand (detection object) interferes with an electric field formed in the NFC antenna 1012 (detection object), a portion of the electric field may be connected in a grounded state, and the NFC controller 1050 may detect an amount of a current loss or an amount of a capacitance change, or an amount of a power loss, etc.

corresponding to this change of the electric field. The NFC controller 1050 may measure an amount of a current loss in the NFC antenna 1012 during a section (for example, a read/write mode of an NFC function or an antenna test function) where a current is periodically supplied to the NFC antenna 1012. The NFC controller 1050 may generate a signal corresponding to an amount of a current loss in the NFC antenna 1012, and output the generated signal to the AP 1001. The NFC controller 1050 may determine a range to which an amount of a current loss belongs, and output a signal corresponding to the determined range. The AP 1001 may output information indicating a state of an antenna via an output unit (for example, the display 1007 or the speaker 1004) in response to a signal from the NFC controller 1050. The AP 1001 may control the switch 1014 and/or the RF transceiver module 1013 in response to a signal from the NFC controller 1050.

The RF transceiver module 1013 includes a transmitter and a receiver, and may transmit/receive an RF signal via at least one cellular antenna 1015-N corresponding to an operation of the switch 1014. The RF transceiver module 1013 may operate in a Single Input Single Output (SISO), Single Input Multiple Output (SIMO), Multiple Input Single Output (MISO), diversity, or Multiple Input Multiple Output (MIMO) communication scheme depending on an operation of the switch 1014. The RF transceiver module 1013 may include all RF parts between a cellular antenna 1015-N and the CP 1002. The RF transceiver module 1013 may include a Radio Frequency Integrated Circuit (RFIC), a front end module, etc. The RFIC (for example, an RF transceiver) may perform an RF function of connecting a signal via a plurality of antennas to a system semiconductor (for example, a modem). The front end module may be a transmission/reception device that may control a radio signal. The front end module may connect an antenna with the RFIC, and separate a transmission/reception signal. The front end module may perform filtering and amplification, and include a reception end front end module mounting a filter that filters a reception signal therein, a Power Amplifier Module (PAM) that amplifies a transmission signal, and a transmission end front end module. During reception of a radio signal, the RF transceiver module 1013 may receive a radio signal from at least one cellular antenna 1015-N, convert the received radio signal to a baseband signal, and transmit the converted baseband signal to the CP 1002. The CP 1002 may process the received baseband signal, and control a personal/mechanical interface of UE 1000 in response to the received baseband signal. During transmission of a radio signal, the CP 1002 may generate a baseband signal and output the same to the RF transceiver module 1013. The RF transceiver module 1013 may receive a baseband signal from the CP 1002, convert the received baseband signal to a radio signal, and transmit the same to the air via at least one antenna 1015-N.

The switch 1014 may selectively use at least one cellular antenna used for cellular communication among a plurality of cellular antennas 1015-N in response to a control signal from the AP 1001. The switch 1014 may selectively use at least one antenna 1015-N used for a transmission (Tx) path and/or a reception (Rx) path of the RF transceiver module 1013 in response to a control signal from the AP 1001. The switch 1014 may selectively use at least one antenna matching circuit 1016-N for compensating for mismatching of at least one cellular antenna 1015-N in response to a control signal from the AP 1001.

Figure 11:
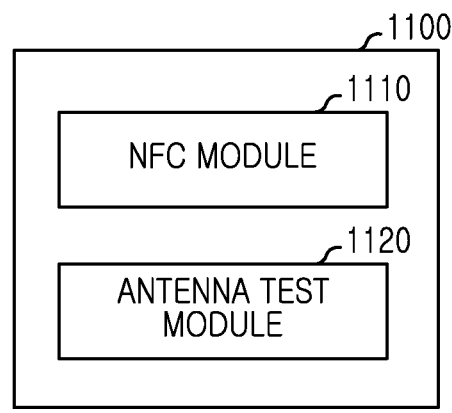
FIG. 11 is a block diagram illustrating configured hardware of an NFC controller according to various embodiments of the present disclosure.

FIG. 11 is a block diagram illustrating an NFC controller according to various embodiments of the present disclosure.

Referring to FIG. 11, the NFC controller 1100 may include an NFC module 1110 and an antenna test module 1120. The modules are hardware configured for operation.

The NFC module 1110 may generate a reception signal corresponding to an RF reception signal received via an NFC antenna 1012 and transmit the same to the processor 1001 or 1002. The NFC module 1110 may generate an RF transmission signal corresponding to a transmission signal received from the AP 1001 and transmit the generated RF transmission signal to the outside via the NFC antenna 1012. For example, in the case where an NFC tag approaches the NFC antenna 1012, the NFC tag may operate in response to a radio wave output from the NFC antenna 1012 to transmit a signal (information) readable by the NFC module 1110 to the NFC antenna 1012. The NFC module 1110 may output information received from an NFC tag to the AP 1001. The AP 1001 may output information received via the NFC module 1110 via an output unit (for example, the display 1007 and the speaker 1004).

The antenna test module 1120 (or the detection module) may measure a returning amount of current that is coming back to the device via the NFC antenna 1012. When a returning amount of current does not meet a reference (for example, less than a threshold), the antenna test module 1120 may output a signal indicating an abnormal operation state (for example, a contact failure between the NFC antenna 1012 and a plurality of terminals 724 or destruction of the NFC antenna 1012, etc.) of the NFC antenna 1012 to the AP 1001. The AP 1001 may display a message (for example, "The NFC antenna is not connected") informing an abnormal state of the NFC antenna via the display 1007 in response to a signal from the antenna test module 1120.

The antenna test module 1120 may measure a returning current amount from the NFC antenna 1012 in an operation (for example, a read/write mode of the NFC function of the NFC module 1110) of periodically supplying a current to the NFC antenna 1012.

A returning current amount may vary depending on a type (for example, a non-NFC metal body, an NFC tag, or a human body, etc.), a position, or an approaching range, etc. of a member approaching the NFC antenna 1012.

The antenna test module 1120 may provide a returning current amount from the NFC antenna to the AP 1001.

FIG. 12 is a view illustrating an amount of a returning current coming back via an NFC antenna in the UE that is subjected to various neighboring circumstances according to various embodiments of the present disclosure. Here, the returning current amount is suggested as a digital value. The NFC controller 1100 (for example, the NFC module 1110) may periodically supply a current to the NFC antenna 1012 in the case where an NFC function has been activated (for example, a read/write mode). Here, the NFC controller 1100 (for example, the antenna test module 1120) may measure a returning current amount coming back via the NFC antenna 1012. The amounts of the user's grip being "high" or "low" in FIG. 12 is relative to a threshold such as the feedback values shown in FIG. 12 for illustrative purposes. Referring now to FIG. 12, for example, in the case where UE 1000 is put on a metal plate, most of a current applied to the NFC antenna 1012 may go to the metal plate. Alternatively, in the case where an NFC tag or an NFC card approaches the UE 1000, a returning current from the NFC antenna 1012 may be greater than a returning current amount from the NFC antenna 1012 in the case where a user grips the UE 1000.

Figure 13:
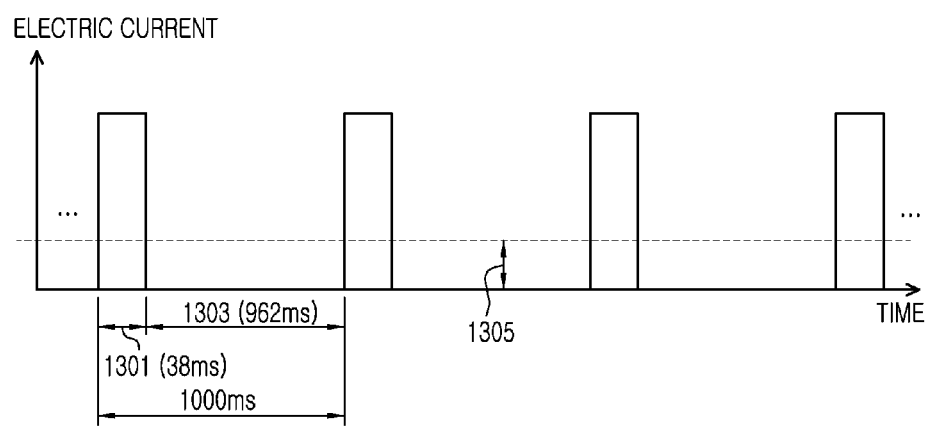
FIG. 13 is a view illustrating a duty-cycle regarding current supply to an NFC antenna of an NFC controller according to various embodiments of the present disclosure.

FIG. 13 is a view illustrating a duty-cycle regarding current supply to an NFC antenna of an NFC controller according to various embodiments of the present disclosure.

Referring now to FIG. 13, the NFC controller 1100 (for example, the NFC module 1110) may periodically supply a current to the NFC antenna 1012 during a read/write mode. The NFC controller 1100 may minimize a level of an average flowing current when actively scanning and processing data, and reduce an amount of battery consumption by periodically supplying a current to the NFC antenna 1012. The average current 1305 may be calculated by applying a time-weighted average to a current of an active section 1301 and a current of a sleep section 1303.

The NFC controller 1100 (for example, the antenna test module 1120) may detect a returning current amount from the NFC antenna 1012 in the active section 1301. Here, the returning current amount may be calculated as an average for a set time.

Figure 14:
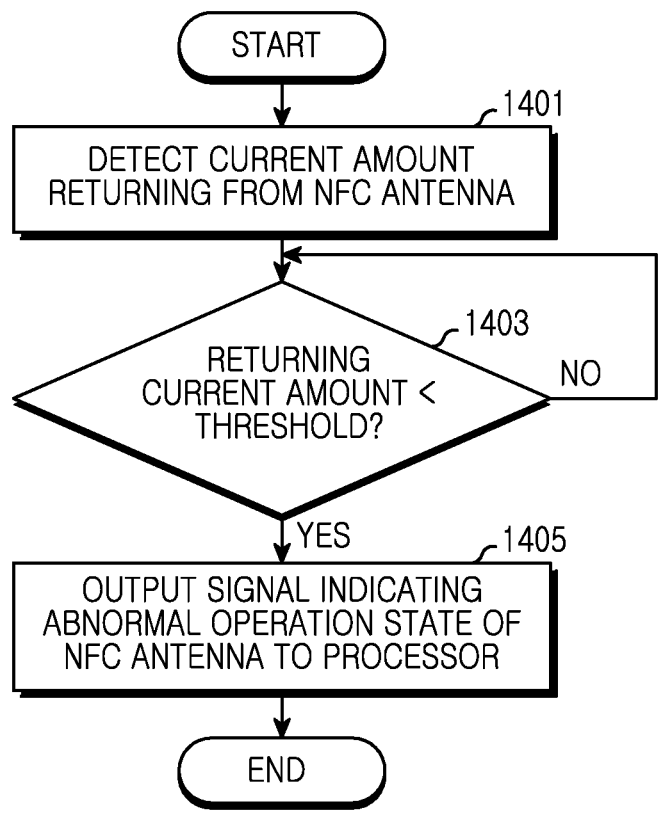
FIG. 14 is a flowchart illustrating a procedure for operating an NFC controller according to various embodiments of the present disclosure.

FIG. 14 is a flowchart illustrating a procedure for operating an NFC controller according to various embodiments of the present disclosure.

Referring now to FIG. 14, at operation 1401, the NFC controller 1100 (for example, the antenna test module 1120) may detect an amount of current (or power) returning from the NFC antenna 1012.

At operation 1403, the NFC controller 1100 (for example, the antenna test module 1120) may determine whether the returning current amount is less than a threshold.

Figure 15:
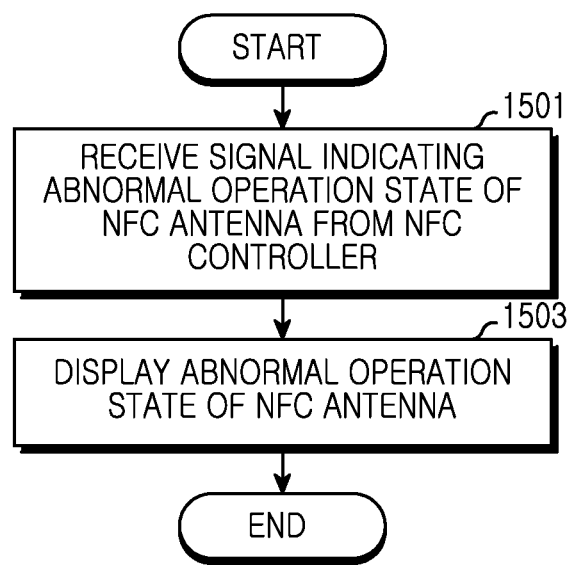
FIG. 15 is a flowchart illustrating a procedure for operating an application processor being executed according to various embodiments of the present disclosure.

When the amount of current that is returning is less than the predefined threshold, the NFC controller 1100 (for example, the antenna test module 1120) may output a signal indicating an abnormal operation state of the NFC antenna 1012 to a processor (for example, the application processor 1001) in operation 1405. FIG. 15 is a flowchart illustrating a procedure for operating an application processor according to various embodiments of the present disclosure.

Referring now to FIG. 15, at operation 1501 the application processor 1001 may receive a signal indicating the abnormal operation state of the NFC antenna 1012 from the NFC controller 1100 that may be abnormal, for example because the amount of current returning is less than a threshold.

At operation 1503, the application processor 1001 may display the abnormal operation state of the NFC antenna 1012.

Figure 16:
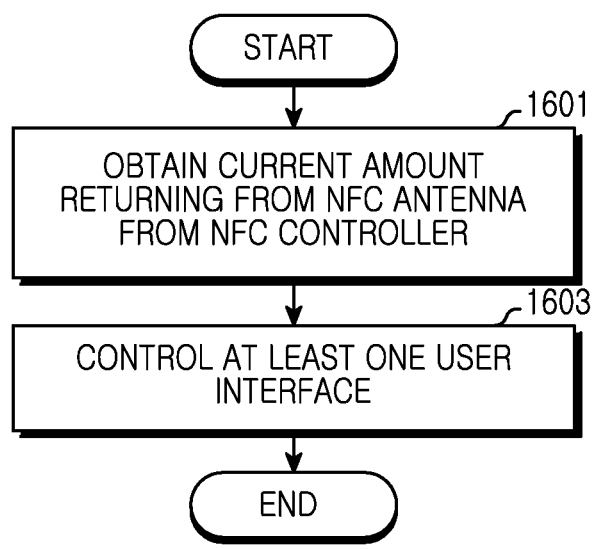
FIG. 16 is a flowchart illustrating a procedure for operating an application processor being executed according to various embodiments of the present disclosure.

FIG. 16 is a flowchart illustrating a procedure for operating an application processor according to various embodiments of the present disclosure.

Referring now to FIG. 16, at operation 1601, the application processor 1001 may obtain a returning current amount for the NFC antenna 1012 from the NFC controller 1100.

At operation 1603, the application processor 1001 may set (for example, display control, voice control, shooting control, or wireless communication control, etc.) at least one user interface corresponding to the amount of returning current. For example, the application processor 1001 may adjust transmission (Tx) power to at least one cellular antenna 1015-N in response to the amount of returning current. Alternatively, the application processor 1001 may select at least one antenna used for cellular communication from among a plurality of cellular antennas 1015-N in response to the returning current amount. Alternatively, the application processor 1001 may select at least one antenna matching circuit 1016-N in response to the amount of returning current, and connect the selected at least one antenna matching circuit 1016-N to the RF transceiver module 1013. Alternatively, the application processor 1001 may switch a call receive mode (for example, a bell sound mode, a mute lamp mode, or a vibration mode, etc.) for call reception in response to the returning current amount. Alternatively, the application processor 1001 may switch a communication mode (for example, a general phone mode or a speaker phone mode, etc.) in response to the returning current amount.

FIGS. 17, 18, 19 and 20 are respective flowcharts illustrating respective procedures for operating an application processor in view of a return current for respectively including matching (FIG. 17), reducing transmission power (FIG. 18), switching call receive mode (FIG. 19) and switching communication mode (FIG. 20), respectively according to various embodiments of the present disclosure.

Figure 17:
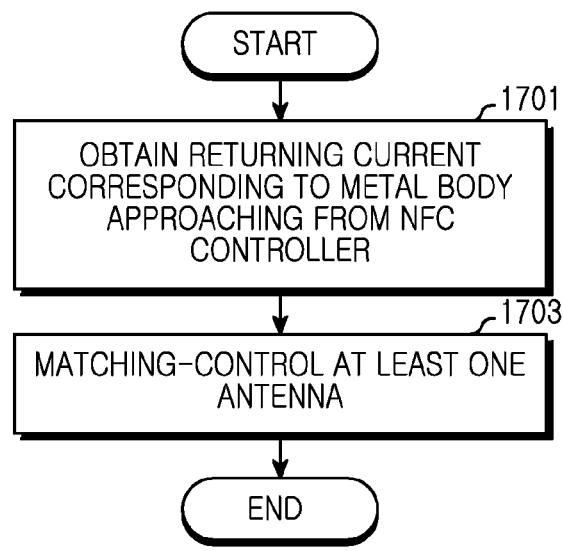
FIG. 17, FIG. 18, FIG. 19 and FIG. 20 are respective flowcharts illustrating respective procedures for operating an application processor in view of a return current for respectively including matching (FIG. 17), reducing transmission power (FIG. 18), switching call receive mode (FIG. 19) and switching communication mode (FIG. 20), respectively according to various embodiments of the present disclosure.

Referring now to FIG. 17, at operation 1701, the application processor 1001 may obtain a returning current amount corresponding to metal body approaching from the NFC controller 1100.

At operation 1703, the application processor 1001 may secure antenna performance in a way of controlling at least one antenna (for example, the cellular antenna 1015-N).

Figure 18:
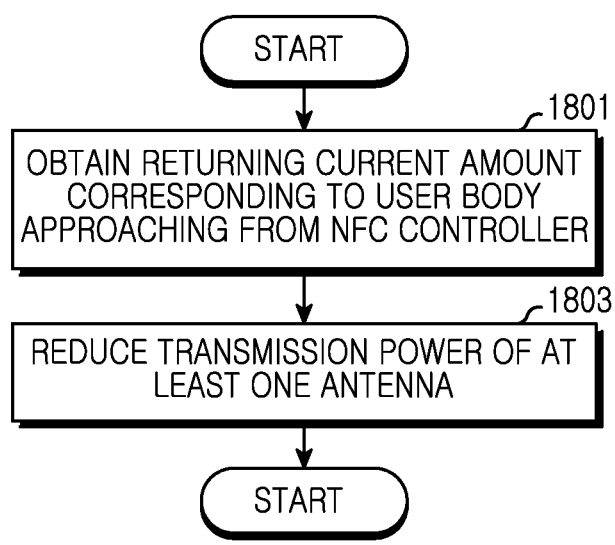

Referring now to FIG. 18, at operation 1801, the application processor 1001 may obtain a returning current amount corresponding to an approaching of a user body (for example, gripping of UE) from the NFC controller 1100.

At operation 1803, the application processor 1001 may reduce Specific Absorption Rate (SAR) in a way of reducing transmission power of at least one antenna (for example, the cellular antenna 1015-N).

Figure 19:
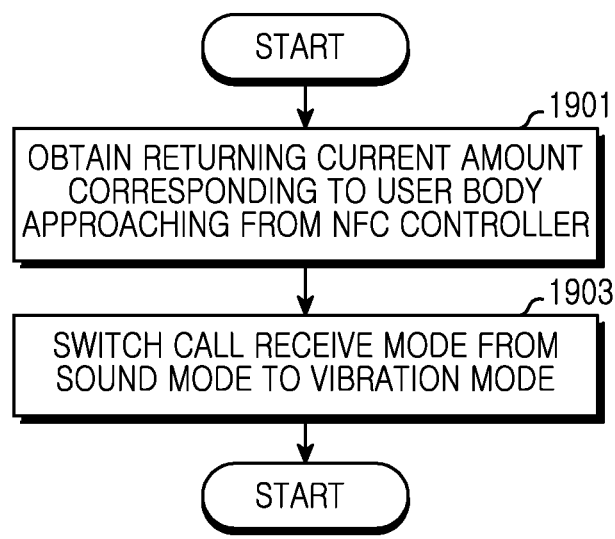

Referring now to FIG. 19, at operation 1901, the application processor 1001 may obtain a returning current amount corresponding to approaching of a user body from the NFC controller 1100.

At operation 1903, the application processor 1001 may switch a call receive mode from a sound mode to a vibration mode. For example, in the case where a user grips UE with his hand, reception of a call may be informed using vibration.

Figure 20:
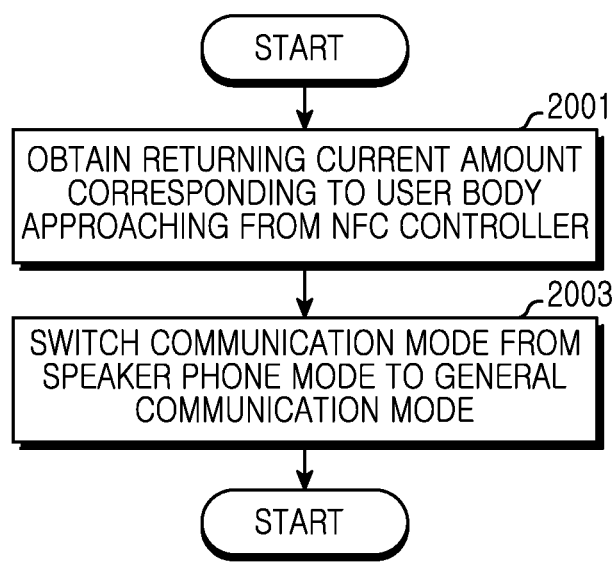

Referring now to FIG. 20, at operation 2001, the application processor 1001 may receive a returning current amount corresponding to approaching of a user body from the NFC controller 1100. At operation 2003, the application processor 1001 may switch a communication mode from a general communication mode to a speaker phone mode. For example, during communication, in the case where a user grips UE, the general communication mode is executed, and in the case where the user puts down the UE on the bottom, the speaker phone mode may be executed.

Figure 21:
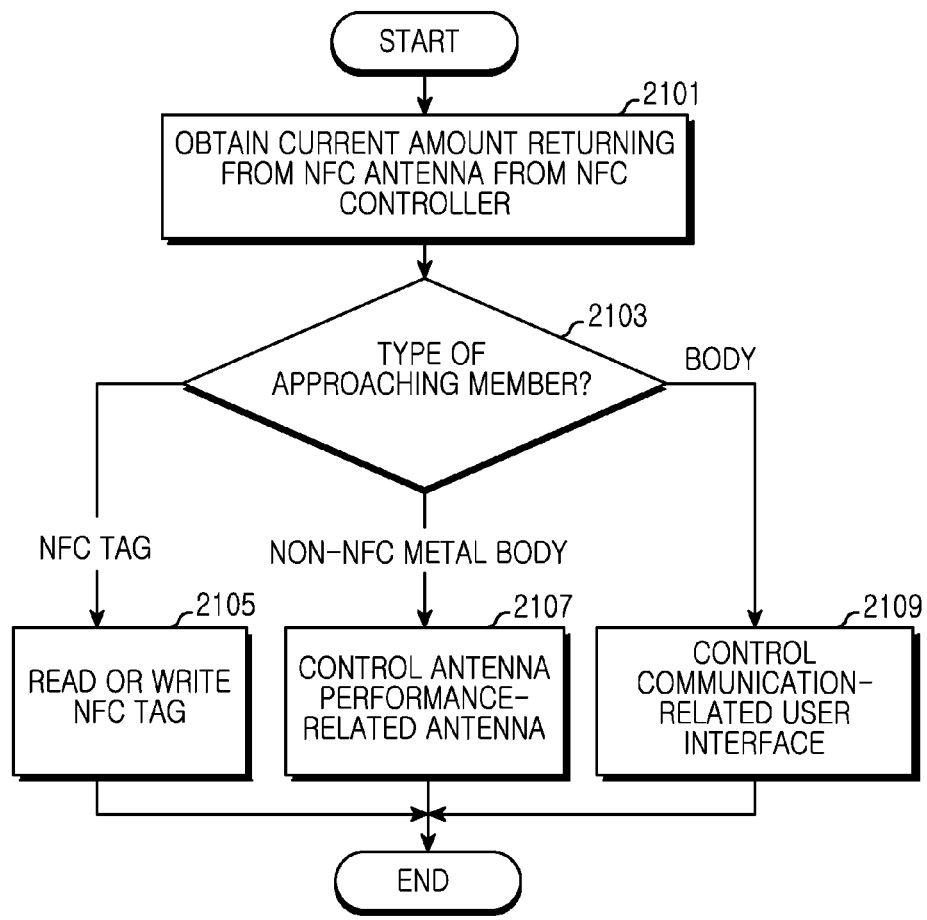
FIG. 21 is a flowchart illustrating a procedure for operating an application processor according to various embodiments of the present disclosure.

FIG. 21 is a flowchart illustrating a procedure for operating an application processor according to various embodiments of the present disclosure.

Referring now to FIG. 21, at operation 2101, the application processor 1001 may obtain a returning current amount for the NFC antenna from the NFC controller 1100.

At operation 2103, the application processor 1001 may determine a type of an approaching member from the returning current amount. For example, referring to FIG. 12, a returning current amount from the NFC antenna may be various depending on a type of an approaching member.

In the case where the approaching member is an NFC tag, at operation 2105, the application processor 1001 may execute reading or writing of the NFC tag.

In the case where the approaching member is a non-NFC metal body, at operation 2107, the application processor 1001 may execute an antenna control related to antenna performance. For example, the application processor 1001 may selectively use at least one antenna 1015-N or at least one matching circuit 1016-N to prevent antenna performance deterioration by the non-NFC metal body.

In the case where an approaching member is a body (for example, a hand, a face, etc.), at operation 2109, the application processor 1001 may set a communication-related user interface. For example, in the case where a user allows an electronic device 1000 to get close to his face and performs communication, the application processor 1001 may reduce a Specific Absorption Rate (SAR) in a way of reducing transmission (Tx) power to a cellular antenna 1015-N. Alternatively, in the case where a user performs communication while gripping the electronic device 1000 with his hand, the application processor 1001 may switch a communication mode from the speaker phone mode to the general communication mode.

According to various embodiments of the present disclosure, an electronic device (for example, the electronic device 101) may include at least one antenna (for example, the NFC antenna 1012), a detection module 210 for detecting an amount of current returning from the at least one antenna, and a setting module 230 for setting at least one user interface corresponding to the amount of current.

According to various embodiments of the present disclosure, in case of periodically supplying a current to the at least one antenna, the detection module 210 may detect the returning amount of current.

According to various embodiments of the present disclosure, a case of periodically supplying a current to the at least one antenna may include a reader/writer mode of an NFC function.

According to various embodiments of the present disclosure, in case of testing an abnormal operation state of the at least one antenna, the detection module 210 may detect the returning amount of current.

According to various embodiments of the present disclosure, the detection module 210 may calculate the returning amount of current using an average for a set time.

According to various embodiments of the present disclosure, the detection module 210 may include at least one sensor (for example, a sensor module 2240) or an NFC controller 1050.

According to various embodiments of the present disclosure, the setting module 230 may determine information regarding an approaching member in response to the amount of current, and set at least one user interface corresponding to the information regarding the approaching member.

According to various embodiments of the present disclosure, the information regarding the approaching member may include at least one of a type of the approaching member, an approach position, an approach distance, or an approach range.

According to various embodiments of the present disclosure, setting the at least one user interface may include at least one of display control, voice control, shooting control, or wireless communication control.

According to various embodiments of the present disclosure, the at least one antenna may include at least one of a cellular antenna, a Near Field Communication (NFC) antenna, a Blue Tooth (BT) antenna, and a Global Positioning System (GPS) antenna.

According to various embodiments of the present disclosure, an operating method of an electronic device may include detecting an amount of a current returning from at least one antenna and setting at least one user interface corresponding to the current amount.

According to various embodiments of the present disclosure, detecting the amount of the current returning from the at least one antenna may include detecting an amount of a current returning in case of periodically supplying a current to the at least one antenna.

According to various embodiments of the present disclosure, a case of periodically supplying a current to the at least one antenna may include a reader/writer mode of a Near Field Communication (NFC) function.

According to various embodiments of the present disclosure, detecting the amount of the current returning from the at least one antenna may include, in case of testing an abnormal operation state of the at least one antenna, detecting the amount of current According to various embodiments of the present disclosure, detecting the amount of the current returning from the at least one antenna may include calculating the amount of current returning by using an average for a set time.

According to various embodiments of the present disclosure, setting the at least one user interface corresponding to the amount of current may include determining information regarding an approaching member in response to the amount of current, and setting the at least one user interface corresponding to the information regarding the approaching member.

According to various embodiments of the present disclosure, setting the at least one user interface may include switching of a call receive mode or switching of a communication mode.

According to various embodiments of the present disclosure, setting the at least one user interface may include adjusting transmission (Tx) power of the at least one antenna.

According to various embodiments of the present disclosure, a Near Field Communication (NFC) controller 1050 may include: an NFC module 1110 for generating a reception signal corresponding to a Radio Frequency (RF) reception signal received via an NFC antenna 1012 to transmit the same to a processor (for example, an application processor 1001), and generating an RF transmission signal corresponding to a transmission signal received from the processor 1001 to transmit the same to an outside via the NFC antenna 1012; and a detection module (for example, an antenna test module 1120) for detecting an amount of a current returning from the NFC antenna 1012 to output the same to the processor 1001.

According to various embodiments of the present disclosure, when the returning current amount is less than a threshold, the detection module 1120 of the NFC controller 1050 may output a signal to the processor 1001 indicating an abnormal operation state of the NFC antenna 1012.

Figure 22:
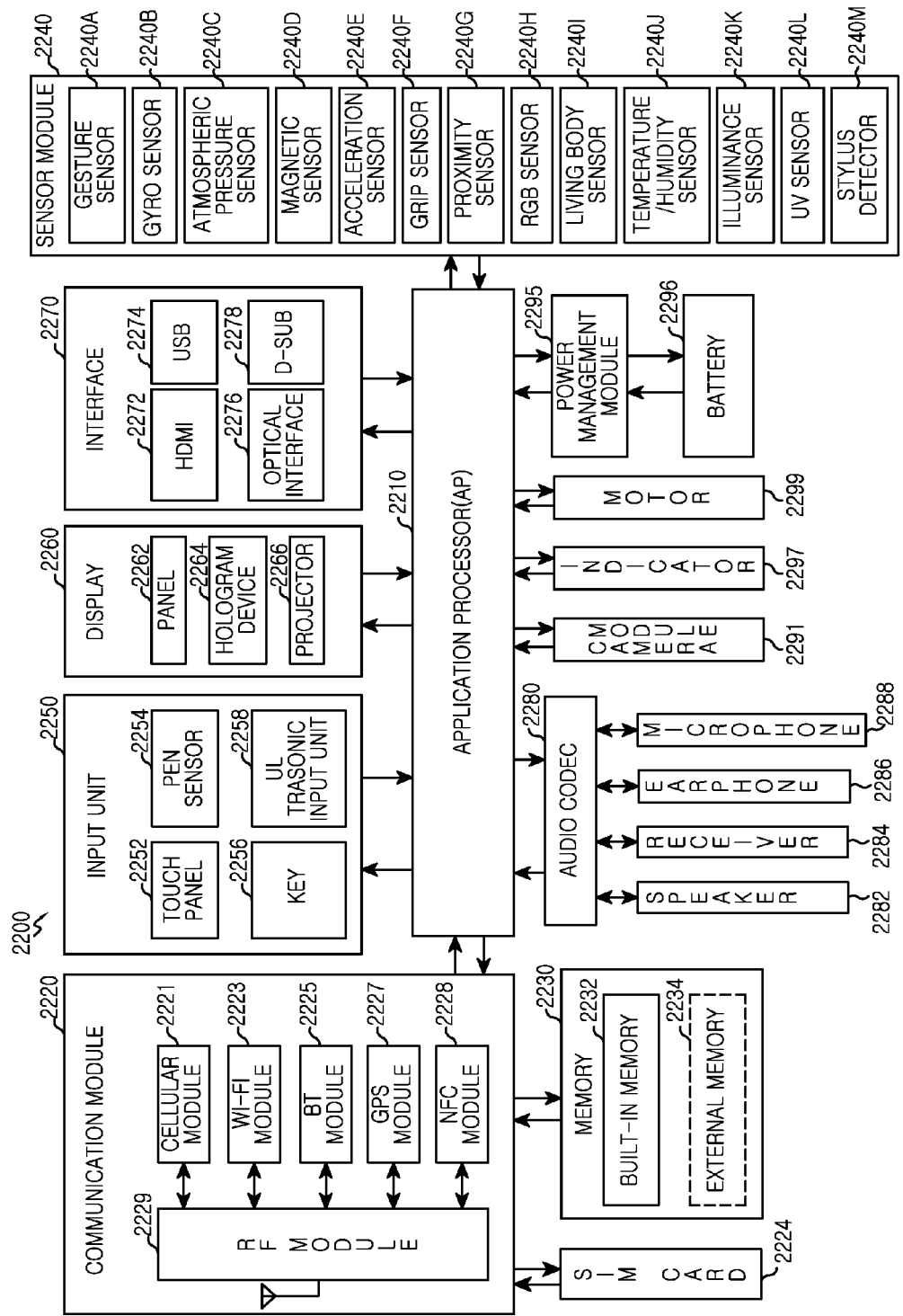
FIG. 22 is a block diagram illustrating an electronic device according to various embodiments of the present disclosure.

FIG. 22 is a block diagram illustrating an electronic device according to various embodiments of the present disclosure.

The electronic device 2200 may configure, for example, all or a portion of the electronic device 101 illustrated in FIG. 1. Referring now to FIG. 22, the electronic device 2200 may include one or more application processors (APs) 2210, a communication module 2220, a subscriber identification module (SIM) card 2224, a memory 2230, a sensor module 2240, an input unit 2250, a display 2260, an interface 2270, an audio module 2280, a camera module 2291, a power management module 2295, a battery 2296, an indicator 2297, and a motor 2298.

The AP 2210 may drive an Operating System (OS) or an application to control a plurality of hardware and software elements connected to the AP 2210, and perform various data processings including multimedia data and an operation. The AP 2210 may be, for example, implemented as a System on Chip (SoC). According to an embodiment, the AP 2210 may further include a Graphic Processing Unit (GPU) (not shown).

The communication module 2220 (for example, the communication interface 170) may perform data transmission/reception in communication between the electronic device 2200 (for example, the electronic device 101) and other electronic devices (for example, the electronic device 104 or the server 106) connected via a network. According to an embodiment, the communication module 2220 may include a cellular module 2221, a Wi-Fi module 2223, a BT module 2225, a GPS module 2227, an NFC module 2228, and a Radio Frequency (RF) module 2229.

The cellular module 2221 may provide voice communication, image communication, a short message service, or an Internet service, etc. via a communication network (for example, LTE, LTE-A, CDMA, WCDMA, UMTS, WiBro, or GSM, etc.). Also, the cellular module 2221 may perform discrimination and authentication of an electronic device within a communication network using, for example, a subscriber identity module (for example, a SIM card 824). According to an embodiment, the cellular module 2221 may perform at least a portion of functions that may be provided by the AP 2210. For example, the cellular module 2221 may perform at least a portion of a multimedia control function.

According to an embodiment, the cellular module 2221 may include a communication processor (CP). Also, the cellular module 2221 may be, for example, implemented as an SoC. Though elements such as the cellular module 2221 (for example, a communication processor), the memory 2230, or the power management module 2295, etc. are illustrated as elements separated from the AP 2210 in FIG. 22, according to an embodiment, the AP 2210 may be implemented to include at least a portion (for example, the cellular module 2221) of the above-described elements.

According to an embodiment, the AP 2210 or the cellular module 2221 (for example, a communication processor) may load an instruction or data received from at least one of a non-volatile memory and other elements connected thereto onto a volatile memory, and process the same. Also, the AP 2210 or the cellular module 2221 may store data received from at least one of other elements or generated by at least one of other elements in a non-volatile memory.

Each of the Wi-Fi module 2223, the BT module 2225, the GPS module 2227, or the NFC module 2228 may include, for example, a processor for processing data transmitted/received via a relevant module. Though the cellular module 2221, the Wi-Fi module 2223, the BT module 2225, the GPS module 2227, or the NFC module 2228 are illustrated as separate blocks in FIG. 22, according to an embodiment, at least a portion (for example, two or more elements) of the cellular module 2221, the Wi-Fi module 2223, the BT module 2225, the GPS module 2227, or the NFC module 2228 may be included in one Integrated Circuit (IC) or an IC package. For example, at least a portion (for example, a communication processor corresponding to the cellular module 2221 and a Wi-Fi processor corresponding to the Wi-Fi module 2223) of processors corresponding to each of the cellular module 2221, the Wi-Fi module 2223, the BT module 2225, the GPS module 2227, or the NFC module 2228 may be implemented as one SoC.

The RF module 2229 may perform transmission/reception of data, for example, transmission/reception of an RF signal. The RF module 2229 may include, for example, a transceiver, a power amp module (PAM), a frequency filter, or a low noise amplifier (LNA), etc., though not shown. Also, the RF module 2229 may further include a part for transmitting/receiving an electromagnetic wave on a free space in wireless communication, for example, a conductor or a conducting line, etc. Though FIG. 22 illustrates the cellular module 2221, the Wi-Fi module 2223, the BT module 2225, the GPS module 2227, and the NFC module 2228 share one RF module 2229, according to an embodiment, at least one of the cellular module 2221, the Wi-Fi module 2223, the BT module 2225, the GPS module 2227, or the NFC module 2228 may perform transmission/reception of an RF signal via a separate RF module.

The SIM card 2224 may be a card including a subscriber identity module, and may be inserted into a slot formed in a specific position of the electronic device. The SIM card 2224 may include unique identify information (for example, integrated circuit card identifier (ICCID)) or subscriber information (for example, international mobile subscriber identity (IMSI)).

The memory 2230 (for example, the memory 130) may include a built-in memory 2232 or an external memory 2234. The built-in memory 2232 may include, for example, at least one of a volatile memory (for example, dynamic RAM "DRAM", static RAM "SRAM", synchronous dynamic RAM "SDRAM") and a non-volatile memory (for example, one time programmable ROM "OTPROM", programmable ROM "PROM", erasable and programmable ROM "EPROM", electrically erasable and programmable ROM "EEPROM", mask ROM, flash ROM, NAND flash memory, NOR flash memory, etc.).

According to an embodiment, the built-in memory 2232 may be a Solid State Drive (SSD). The external memory 2234 may further include a flash drive, for example, compact flash (CF), secure digital (SD), micro secure digital (Micro-SD), mini secure digital (Mini-SD), extreme digital (xD), or a memory stick. The external memory 2234 may be functionally connected with the electronic device 2200 via various interfaces. According to an embodiment, the electronic device 2200 may further include a storage device (or a storage medium) such as a hard drive.

The sensor module 2240 may measure a physical quantity or detect an operation state of the electronic device 2200, and convert the measured or detected information to an electric signal. The sensor module 2240 may include, for example, at least one of a gesture sensor 2240A, a gyro sensor 2240B, an atmospheric pressure sensor 2240C, a magnetic sensor 2240D, an acceleration sensor 2240E, a grip sensor 2240F, a proximity sensor 2240G, a color sensor 2240H (for example, RGB (red, green, blue) sensor), a living body sensor 2240I, a temperature/humidity sensor 2240J, an illuminance sensor 2240K, an ultra violet (UV) sensor 2240L, or a stylus detector 2240M. Additionally or alternatively, the sensor module 2240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 2240 may further include a control circuit for controlling at least one sensor belonging thereto.

The input unit 2250 may include a touch panel 2252, a (digital) pen sensor 2254, a key 2256, or an ultrasonic input unit 2258. The touch panel 2252 may recognize a touch input using at least one of capacitive, resistive, infrared, or ultrasonic methods. Also, the touch panel 2252 may further include a control circuit. A capacitive touch panel may perform detection by a physical contact or proximity recognition. The touch panel 2252 may further include a tactile layer. In this case, the touch panel 2252 may provide a tactile reaction to a user.

The (digital) pen sensor 2254 may be implemented using, for example, a method which is the same as or similar to receiving a user's touch input, or using a separate sheet for detection. The key 2256 may include, for example, a physical button, an optical key or keypad. The ultrasonic input unit 2258 is a unit for recognizing data by detecting a sound wave using a microphone (for example, a microphone 2288) in the electronic device 2200 via an input tool generating an ultrasonic signal, and enables wireless recognition. According to an embodiment, the electronic device 2200 may receive a user input from an external device (for example, a computer or a server) connected to the communication module 2220 using the communication module 2220.

The display 2260 (for example, the output unit 150) may include a panel 2262, a hologram device 2264, or a projector 2266. The panel 2262 may be, for example, a liquid crystal display (LCD), or an active-matrix organic light-emitting diode (AM-OLED), etc. The panel 2262 may be implemented, for example, such that it is flexible, transparent, or wearable. The panel 2262 may be configured as one module together with the touch panel 2252. The hologram device 2264 may show a three-dimensional image in the air using interferences of light. The projector 2266 may project light onto a screen to display an image. The screen may be positioned, for example, inside or outside the electronic device 2200. According to an embodiment, the display 2260 may further include a control circuit for controlling the panel 2262, the hologram device 2264, or the projector 2266.

With continued reference to FIG. 22, the interface 2270 may include, for example, a high-definition multimedia interface (HDMI) 2272, a universal serial bus (USB) 2274, an optical interface 2276, or a D-subminiature (D-sub) 2278. The interface 2270 may be included, for example, in the communication interface 170 illustrated in FIG. 1. Additionally or alternatively, the interface 2270 may include a mobile high-definition link (MHL) interface, a secure digital (SD) card/multi-media card (MMC) interface, or an infrared data association (IrDA) standard interface.

The audio module 2280 may convert a sound and an electric signal in dual directions. At least a partial element of the audio module 2280 may be included, for example, in the I/O interface 140 illustrated in FIG. 1. The audio module 2280 may process sound information input or output via, for example, a speaker 2282, a receiver 2284, an earphone 2286, or a microphone 2288, etc.

The camera module 2291 is a device that may shoot a still image and a moving picture. According to an embodiment, the camera module 2291 may include one or more image sensors (for example, a front sensor or a rear sensor), a lens (not shown), an image signal processor (ISP) (not shown), or a flash (not shown) (for example, an LED or xenon lamp).

The power management module 2295 may manage power of the electronic device 2200. Though not shown, the power management module 2295 may include, for example, a power management integrated circuit (PMIC), a charger integrated circuit (IC), or a battery or a battery or fuel gauge.

The PMIC may be mounted, for example, inside an integrated circuit or an SoC semiconductor. A charging method may be classified into a wired charging method and a wireless charging method. The charging IC may charge a battery and prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 2296, a voltage, a current, or a temperature while charging. The battery 2296 may store or generate electricity, and supply power to the electronic device 2200 using the stored or generated electricity. The battery 2296 may include, for example, a rechargeable battery or a solar battery.

The indicator 2297 may display a specific state of the electronic device 2200 or a portion thereof (for example, the AP 2210), for example, a booting state, a message state, or a charging state, etc. The motor 2298 may convert an electric signal to mechanical vibration. Though not shown, the electronic device 2200 may include a processor (for example, a GPU) for supporting a mobile TV. The processor for supporting the mobile TV may process media data corresponding to standards, for example, such as digital multimedia broadcasting (DMB), digital video broadcasting (DVB), or a media flow, etc.

Each of the above-described elements of the electronic device according the present disclosure may be configured using one or more components, and a name of a relevant element may change depending on a type of the electronic device. An electronic device according to the present disclosure may include at least one of the above-described elements, and a portion of the elements may be omitted, or additional other elements may be further included. Also, a portion of the elements of the electronic device according to the present disclosure may combine to form one entity and equally perform a function of the relevant elements before the combination.

According to various embodiments, at least a portion of an apparatus (for example, modules or functions thereof) or a method (for example, operations) according to the present disclosure may be implemented as an instruction stored in a computer-readable storage media, for example, in the form of a programming module. An instruction may allow the one or more processors to perform a function corresponding to the instruction when executed by one or more processors (for example, the processor 120). The computer-readable storage media may be, for example, the memory 130. At least a portion of a programming module may be implemented (for example, executed) by, for example, the processor 120. At least a portion of the programming module may include, for example, a module, a program, a routine, sets of instructions, or a process, etc. for performing one or more functions.

The computer-readable storage media may include a hard disk, a magnetic media such as a floppy disk and a magnetic tape, Compact Disc Read Only Memory (CD-ROM), optical media such as Digital Versatile Disc (DVD), magneto-optical media such as a floptical disk, and a hardware device specially configured for storing and performing a program instruction (for example, a programming module) such as Read Only Memory (ROM), Random Access Memory (RAM), a flash memory, etc. Also, the program instruction may include not only a machine language code generated by a compiler but also a high-level language code executable by a computer using an interpreter, etc. The above-described hardware device may be configured to operate in order to perform an operation of the present disclosure.

A module or a programming module according to various embodiments of the present disclosure may include at least one of the above-described elements, omit a portion thereof, or further include additional other elements. Operations performed by a module, a programming module, or other elements according to various embodiments of the present disclosure may be executed in a sequential, parallel, or heuristic method. Also, a portion of the operations may be executed in a different sequence, omitted, or other operations may be added.

According to various embodiments of the present disclosure, a storage medium storing instructions is provided. The instructions, when executed by at least one processor, are set to allow the at least one processor to perform at least one operation. In an operating method of an electronic device, the at least one operation may include detecting an amount of a current returning from at least one antenna, and setting at least one user interface corresponding to the current amount.

Also, embodiments of the present disclosure disclosed in the present specification and drawings suggest only a specific example in order to easily explain technical content according to an embodiment of the present disclosure and help understanding of an embodiment of the present disclosure, and are not intended for limiting the scope of an embodiment of the present disclosure. Therefore, it should be construed that the scope of various embodiments of the present disclosure includes not only the embodiments disclosed herein but also all changes and modified forms derived based on the technical spirit of various embodiments of the present disclosure.

The apparatuses and methods of the disclosure can be implemented in hardware configured for operation that can be stored on a non-transitory machine readable medium such as a CD ROM, a RAM, a floppy disk, a hard disk, thumbnail or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. §101. Additionally or alternatively, as used throughout the disclosure, the term "processing circuitry" may refer to any combination of two or more of: (i) the processor, (ii) the interface controller (e.g., a USB controller), and (iii) any other type of (integrated) circuit that may be part of the electronic device.

The definition of the terms "unit" or "module" as referred to herein are to be understood as constituting hardware circuitry that may include but are not limited to a CCD, CMOS, ASIC or FPGA as integrated circuits of a processor or microprocessor (as part of or constituting a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

What is claimed is:

1. An electronic device comprising:
   at least one antenna in which a supplied current passes through and circulates along a radiation pattern;
   a detection module configured to detect an amount of a return current returning to the electronic device from the at least one antenna; and
   a setting module configured to determine an external environment based on set ranges of an amount of a return current corresponding to a respective one of a plurality of external environment and the detected amount of the return current; and
   to set at least one user interface corresponding to the determined external environment.

2. The electronic device of claim 1, wherein an abnormal operation is determined in response to the detected amount of the return current is below a threshold value.

3. The electronic device of claim 1, wherein a call receive mode switches from a sound mode to a vibration mode in response to the detected amount of the return current being indicative that the at least one user interface is being gripped by a user.

4. The electronic device of claim 1, wherein the electronic device switches between a general communication mode and a speaker phone mode in response to the detected amount of the return current being indicative as to whether the at least one user interface is being gripped by a user.

5. The electronic device of claim 1, wherein the detection module is configured to detect the amount of the return current while periodically supplying the current to the at least one antenna to circulate along the radiation pattern.

6. The electronic device of claim 5, wherein the periodically supplying the current to the at least one antenna is performed in a read/write mode of a Near Field Communication (NFC) function.

7. The electronic device of claim 1, wherein the detection module is configured to detect the amount of the return current while testing an abnormal operation state of the at least one antenna.

8. The electronic device of claim 1, wherein the detection module is configured to detect the amount of the return current using an average for a predefined time period.

9. The electronic device of claim 1, wherein the detection module comprises at least one sensor or an NFC controller.

10. The electronic device of claim 1, wherein the setting module is configured to determine information regarding an approaching member in response to the detected amount of the return current, and sets the at least one user interface corresponding to the determined information regarding the approaching member.

11. The electronic device of claim 10, wherein the determined information regarding the approaching member comprises at least one of a type of the approaching member, an approach position, an approach distance, or an approach range.

12. The electronic device of claim 1, wherein when an NFC tag or an NFC card approaches the at least one user interface and the at least one antenna comprises an NFC antenna, a detected amount of the return current from the NFC antenna is greater than the detected amount of the return current from the NFC antenna when a user grips the at least one user interface.

13. The electronic device of claim 1, wherein setting the at least one user interface comprises at least one of display control, voice control, shooting control, or wireless communication control.

14. The electronic device of claim 1, wherein the at least one antenna comprises at least one of a cellular antenna, a Near Field Communication (NFC) antenna, a Blue Tooth (BT) antenna, and a Global Positioning System (GPS) antenna.

15. An operating method of an electronic device comprising:
supplying a current to at least one antenna that passes through and circulates along a radiation pattern;
detecting an amount of a return current returning from at least one antenna;
determining an external environment based on set ranges of an amount of a return current corresponding to a respective one of a plurality of external environment and the detected amount of the return current; and
setting at least one user interface corresponding to the determined external environment.

16. The method of claim 15, wherein detecting the amount of the return current comprises:
detecting the amount of the return current while periodically supplying a current to the at least one antenna.

17. The method of claim 16, wherein the periodically supplying the current to the at least one antenna is provided in a read/write mode of a Near Field Communication (NFC) function.

18. The method of claim 15, wherein detecting the amount of the return current comprises:
detecting the amount of the return current when testing an abnormal operation state of the at least one antenna.

19. The method of claim 15, wherein detecting the amount of the return current comprises:
calculating the amount of the return current from the at least one antenna using an average for a predefined time period.

20. The method of claim 15, wherein setting the at least one user interface corresponding to the detected amount of the current comprises:
determining information regarding an approaching member in response to the detected amount of the return current; and
setting the at least one user interface corresponding to the determined information regarding the approaching member.

21. The method of claim 20, wherein the determined information regarding the approaching member comprises at least one of a type of the approaching member, an approach position, an approach distance, or an approach range.

22. The method of claim 15, wherein setting the at least one user interface comprises at least one of display control, voice control, shooting control, or wireless communication control.

23. The method of claim 22, wherein setting the at least one user interface comprises switching of a call receive mode or switching of a communication mode.

24. The method of claim 22, wherein setting the at least one user interface comprises adjusting transmission (Tx) power of the at least one antenna.

25. The method of claim 23, further comprising switching the call receive mode from a sound mode to a vibration mode in response to detecting the amount of the return current being indicative that the at least one user interface is being gripped by a user.

26. The method of claim 23, further comprising switching between a general communication mode and a speaker phone mode in response to the detecting the amount of the return current being indicative as to whether the at least one user interface is being gripped by a user.

27. A Near Field Communication (NFC) controller comprising:
an NFC module configured to generate a reception received signal corresponding to a Radio Frequency (RF) reception signal received via an NFC antenna, and to transmit the reception received signal to a processor, in which the NFC module further is configured to generate an RF transmission signal corresponding to a transmission signal received from the processor, and to output the generated RF transmission signal via the NFC antenna;
a detection module configured to detect an amount of a current of the outputted RF transmission signal returning from the NFC antenna, and to output to the processor the detected amount of the current returning from the NFC antenna; and
a setting module configured to determine an external environment based on set ranges of an amount of a current returning from the NFC antenna corresponding to a respective one of a plurality of external environment and the detected amount of the current.

28. The NFC controller of claim 27, wherein the detection module is configured to output a signal indicating an abnormal operation state of the NFC antenna to the processor when the detected amount of the current is less than a threshold.

* * * * *